United States Patent
Katsavounidis

(10) Patent No.: US 12,284,363 B2
(45) Date of Patent: Apr. 22, 2025

(54) TECHNIQUES FOR SELECTING RESOLUTIONS FOR ENCODING DIFFERENT SHOT SEQUENCES

(71) Applicant: NETFLIX, INC., Los Gatos, CA (US)

(72) Inventor: Ioannis Katsavounidis, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/532,869

(22) Filed: Nov. 22, 2021

(65) Prior Publication Data

US 2022/0086453 A1  Mar. 17, 2022

Related U.S. Application Data

(63) Continuation of application No. 15/902,971, filed on Feb. 22, 2018, now Pat. No. 11,184,621.
(Continued)

(51) Int. Cl.
*G06K 9/00* (2022.01)
*G11B 20/00* (2006.01)
(Continued)

(52) U.S. Cl.
CPC ..... *H04N 19/147* (2014.11); *G11B 20/00007* (2013.01); *G11B 27/3081* (2013.01);
(Continued)

(58) Field of Classification Search
None
See application file for complete search history.

(56) References Cited

U.S. PATENT DOCUMENTS

| 5,612,742 A | 3/1997 | Krause et al. |
| 7,394,410 B1 | 7/2008 | Wegener |

(Continued)

FOREIGN PATENT DOCUMENTS

| CN | 1393109 A | 1/2003 |
| CN | 1778117 A | 5/2006 |

(Continued)

OTHER PUBLICATIONS

Final Office Action received for U.S. Appl. No. 17/151,079 dated Jun. 2, 2022, 21 pages.
(Continued)

*Primary Examiner* — Wei Wen Yang
(74) *Attorney, Agent, or Firm* — Artegis Law Group, LLP

(57) ABSTRACT

In various embodiments, an encoding optimization application encodes a source video sequence. The encoding optimization application partitions a source video sequence associated with a media title into multiple subsequences that include a first subsequence and a second subsequence. The encoding optimization application then generates a first encoded subsequence based on the first subsequence and a first resolution. The encoding optimization application generates a second encoded subsequence based on the second subsequence and a second resolution. Notably, the second resolution is higher than the first resolution. The encoding optimization application then aggregates the first encoded subsequence and the second encoded subsequence to generate an encoded video sequence. At least a portion of the encoded video sequence is subsequently streamed to an endpoint device during a playback of the media title.

19 Claims, 7 Drawing Sheets

Related U.S. Application Data

(60) Provisional application No. 62/550,517, filed on Aug. 25, 2017, provisional application No. 62/534,170, filed on Jul. 18, 2017, provisional application No. 62/462,873, filed on Feb. 23, 2017.

(51) Int. Cl.

| | | |
|---|---|---|
| *G11B 27/30* | (2006.01) | |
| *G11B 27/34* | (2006.01) | |
| *H04L 65/612* | (2022.01) | |
| *H04L 65/70* | (2022.01) | |
| *H04L 65/75* | (2022.01) | |
| *H04L 65/80* | (2022.01) | |
| *H04N 19/124* | (2014.01) | |
| *H04N 19/147* | (2014.01) | |
| *H04N 19/172* | (2014.01) | |
| *H04N 19/177* | (2014.01) | |
| *H04N 19/179* | (2014.01) | |
| *H04N 19/192* | (2014.01) | |
| *H04N 19/196* | (2014.01) | |
| *H04N 19/59* | (2014.01) | |
| *H04N 21/234* | (2011.01) | |
| *H04N 21/2343* | (2011.01) | |
| *H04N 21/238* | (2011.01) | |
| *H04N 21/845* | (2011.01) | |
| *H04N 19/126* | (2014.01) | |
| *H04N 19/15* | (2014.01) | |
| *H04N 19/40* | (2014.01) | |

(52) U.S. Cl.
CPC ............ *G11B 27/34* (2013.01); *H04L 65/612* (2022.05); *H04L 65/70* (2022.05); *H04L 65/762* (2022.05); *H04L 65/764* (2022.05); *H04L 65/80* (2013.01); *H04N 19/124* (2014.11); *H04N 19/172* (2014.11); *H04N 19/177* (2014.11); *H04N 19/179* (2014.11); *H04N 19/192* (2014.11); *H04N 19/198* (2014.11); *H04N 19/59* (2014.11); *H04N 21/23418* (2013.01); *H04N 21/234363* (2013.01); *H04N 21/23439* (2013.01); *H04N 21/23805* (2013.01); *H04N 21/8456* (2013.01); *G11B 2020/00072* (2013.01); *H04N 19/126* (2014.11); *H04N 19/15* (2014.11); *H04N 19/40* (2014.11); *H04N 21/8455* (2013.01)

(56) References Cited

U.S. PATENT DOCUMENTS

| | | |
|---|---|---|
| 8,837,601 B2 | 9/2014 | Ronca et al. |
| 8,982,942 B2 | 3/2015 | Gao et al. |
| 9,036,712 B1 | 5/2015 | Cote et al. |
| 9,131,202 B1 | 9/2015 | Espeset et al. |
| 9,398,301 B2 | 7/2016 | Ronca et al. |
| 9,584,700 B2 | 2/2017 | Morovic et al. |
| 10,074,382 B2 | 9/2018 | Hoerich et al. |
| 10,097,339 B1 | 10/2018 | Pogue |
| 10,666,992 B2 | 5/2020 | Katsavounidis |
| 10,742,708 B2 | 8/2020 | Katsavounidis et al. |
| 10,778,354 B1 | 9/2020 | Hegar et al. |
| 11,153,581 B1 | 10/2021 | Purushe |
| 2002/0116715 A1 | 8/2002 | Apostolopoulos |
| 2004/0161158 A1 | 8/2004 | Kondo et al. |
| 2005/0031219 A1 | 2/2005 | Puri et al. |
| 2005/0111824 A1 | 5/2005 | Hunter et al. |
| 2007/0047639 A1 | 3/2007 | Ye |
| 2007/0064793 A1 | 3/2007 | Wang et al. |
| 2008/0043832 A1 | 2/2008 | Barkley et al. |
| 2008/0232466 A1 | 9/2008 | Faerber et al. |
| 2009/0295905 A1 | 12/2009 | Civanlar et al. |
| 2010/0189183 A1 | 7/2010 | Gu et al. |
| 2010/0202671 A1 | 8/2010 | Chen et al. |
| 2010/0290520 A1 | 11/2010 | Kamisli et al. |
| 2011/0052087 A1 | 3/2011 | Mukherjee |
| 2011/0069939 A1 | 3/2011 | Choi et al. |
| 2011/0075734 A1 | 3/2011 | Sakazume |
| 2011/0090949 A1 | 4/2011 | Gu |
| 2011/0286525 A1 | 11/2011 | Kamisli et al. |
| 2012/0147958 A1 | 6/2012 | Ronca et al. |
| 2012/0195369 A1 | 8/2012 | Guerrero |
| 2012/0330632 A1 | 12/2012 | Oganov et al. |
| 2013/0051768 A1 | 2/2013 | Soroushian et al. |
| 2013/0089154 A1 | 4/2013 | Chen et al. |
| 2013/0223510 A1 | 8/2013 | Coudurier et al. |
| 2013/0329781 A1 | 12/2013 | Su et al. |
| 2014/0040498 A1 | 2/2014 | Oyman et al. |
| 2014/0201324 A1 | 7/2014 | Zhang et al. |
| 2014/0219346 A1* | 8/2014 | Ugur .................. H04N 19/105 375/240.12 |
| 2014/0241418 A1 | 8/2014 | Garbas et al. |
| 2014/0294362 A1 | 10/2014 | Pettersson et al. |
| 2015/0071346 A1 | 3/2015 | Ronca et al. |
| 2015/0127337 A1 | 5/2015 | Heigold et al. |
| 2015/0179224 A1 | 6/2015 | Bloch et al. |
| 2015/0370796 A1 | 12/2015 | Abramson et al. |
| 2016/0094802 A1 | 3/2016 | Thomas et al. |
| 2016/0212433 A1 | 7/2016 | Zhu et al. |
| 2016/0379057 A1 | 12/2016 | Katsavounidis |
| 2017/0078376 A1 | 3/2017 | Coward et al. |
| 2017/0078686 A1 | 3/2017 | Coward et al. |
| 2017/0186147 A1 | 6/2017 | He et al. |
| 2018/0007355 A1 | 1/2018 | Borel et al. |
| 2018/0041788 A1 | 2/2018 | Wang et al. |
| 2018/0063536 A1 | 3/2018 | Carmel et al. |
| 2018/0063549 A1 | 3/2018 | Amer et al. |
| 2018/0160161 A1 | 6/2018 | Reznik et al. |
| 2018/0240502 A1 | 8/2018 | Katsavounidis |
| 2018/0241795 A1 | 8/2018 | Katsavounidis |
| 2018/0242002 A1 | 8/2018 | Katsavounidis |
| 2018/0242015 A1 | 8/2018 | Katsavounidis |
| 2018/0302456 A1 | 10/2018 | Katsavounidis et al. |
| 2018/0343458 A1 | 11/2018 | Katsavounidis et al. |
| 2019/0028529 A1 | 1/2019 | Katsavounidis |
| 2019/0028745 A1 | 1/2019 | Katsavounidis |

FOREIGN PATENT DOCUMENTS

| | | |
|---|---|---|
| CN | 102668495 A | 9/2012 |
| CN | 102833538 A | 12/2012 |
| CN | 103501445 A | 1/2014 |
| CN | 103501446 A | 1/2014 |
| CN | 103918009 A | 7/2014 |
| CN | 103999090 A | 8/2014 |
| CN | 104185024 A | 12/2014 |
| CN | 104346613 A | 2/2015 |
| CN | 104737149 A | 6/2015 |
| CN | 104767999 A | 7/2015 |
| CN | 105868700 A | 8/2016 |
| CN | 106537923 A | 3/2017 |
| EP | 2 410 749 A1 | 1/2012 |
| JP | 2005-260576 A | 9/2005 |
| WO | 02/32141 A2 | 4/2002 |

OTHER PUBLICATIONS

Notice of Allowance received for U.S. Appl. No. 17/151,079 dated Apr. 19, 2023, 18 pages.
Non Final Office Action received for U.S. Appl. No. 16/053,754 dated Jul. 6, 2022, 23 pages.
Final Office Action received for U.S. Appl. No. 16/053,754 dated Jan. 26, 2023, 17 pages.
Non Final Office Action received for U.S. Appl. No. 17/504,412 dated Feb. 2, 2023, 50 pages.
Non Final Office Action received for U.S. Appl. No. 17/516,525 dated Mar. 17, 2023, 48 pages.
Non-Final Office Action received for U.S. Appl. No. 17/151,079, dated Nov. 24, 2021, 47 pages.

(56) References Cited

OTHER PUBLICATIONS

Final Office Action received for U.S. Appl. No. 17/170,661 dated Aug. 22, 2022, 30 pages.
Non Final Office Action received for U.S. Appl. No. 17/151,079 dated Sep. 29, 2022, 17 pages.
Notice of Allowance received for U.S. Appl. No. 16/882,386 dated Oct. 13, 2022, 20 pages.
Westerink et al., "An Optimal Bit Allocation Algorithm for Sub-Band Coding", ICASSP-88., International Conference on Acoustics, Speech, and Signal Processing, Apr. 11-14, 1988, pp. 757-760.
Riskin, Eve A., "Optimal Bit Allocation via the Generalized BFOS Algorithm", IEEE Transactions on Information Theory, Mar. 1, 1991, vol. 37, No. 2, pp. 400-402.
Yu et al., "Efficient Rate Control for JPEG-2000", IEEE Transactions on Circuits and Systems for Video Technology, May 1, 2006, vol. 16, No. 5, pp. 577-589.
Wu et al., "Rate-Constrained Picture-Adaptive Quantization for JPEG Baseline Coders", IEEE International Conference on Acoustics, Speech, and Signal Processing, Apr. 27-30, 1993, pp. 389-392.
Sermadevi et al., "Efficient Bit Allocation for Dependent Video Coding", DCC '04 Proceedings of the Conference on Data Compression, Mar. 23, 2004, 6 pages.
Ramchandran et al., "Bit Allocation for Dependent Quantization with Applications to Multiresolution and MPEG Video Coders", IEEE Transactions on Image Processing, Sep. 1994, vol. 3, No. 5, pp. 533-545.
Ortega et al., "Rate-Distortion Methods for Image and Video Compression", IEEE Signal Processing Magazine, Nov. 1998, vol. 15, No. 6, pp. 23-50.
Wiegand et al., "Overview of the H.264/AVC Video Coding Standard," DOI: 10.1109/TCSVT.2003.815165, Circuits and Systems for Video Technology, IEEE Transactions, vol. 13, No. 7, Jul. 2003, pp. 560-576.
Zhao et al., "Another example of software replacing hardware: Real-time software MPEG-2 SDI/HD encoding for digital tv broadcasting," in NAB Broadcast Engineering Conference, 2003, pp. 37-40.
The Netflix tech blog: High quality video encoding at scale, link: http://techblog.netnix.com/2015/12/high-qualityvideo-encoding-at-scale.html.
E. Richardson, H. 264 and MPEG-4 video compression: video coding for next-generation multimedia. John Wiley & Sons, 2004.
R. G. Keys, "Cubic convolution interpolation for digital image processing," IEEE Trans. on Acoustics, Speech, and Signal Processing, vol. ASSP-29, No. 6, 1981, pp. 1153-1160.
Lanczos, Cornelius, "Resampling", Retrieved from http://en.wikipedia.org/wiki/Lanczos, Wikipedia, 5 pages.
"The Netflix tech blog: Per-Title Encode Optimization," link: http://techblog.netflix.com/2015/12/per-title-encode-Jptimization.html, 17 pages.
Katsavounidis et al., "Native resolution detection of video sequences," in SMPTE 2015 Annual Technical Conference and Exhibition, manuscript version dated Sep. 3, 2015, 26 pages.
Li et al.,"Toward A Practical Perceptual Video Quality Metric", Nelflix Technology Blog, https://nelflixtechblog.com/toward-a-practical-perceptual-video-quality-metric-653f208b9652, Jun. 6, 2016, 21 pages.
Mitrofanov et al., "x264," Retrieved from link: https://en.wikipedia.org/wiki/X264, Wikipedia, 5 pages.
Tavakoli et al., "Quality of experience of adaptive video streaming: Investigation in service parameters and subjective quality assessment methodology," Signal Processing: Image Communication, vol. 39, pp. 432-443, 2015.
Consumer Digital Video Library—El Fuente, link: http://www.cdvl.org/documents/ElFuente_summary.pdf.
Sullivan et al., Rate-distortion optimization for video compression; IEEE signal processing magazine, vol. 15, No. 6, 1998, pp. 74-90.
Thiede et al., "Peaq-the ITU standard for objective measurement of perceived audio quality," Journal of the Audio Engineering Society, vol. 48, No. 1/2, 2000, pp. 3-29.
Consumer Digital Video Library; link: http://www.cdvl.org.
"Advanced video coding for generic audiovisual services", I T U-T Rec. H.264 and ISO/IEC 14496-10 (AVG), 2003, 282 pages.
"High effciency video coding", I T U-T Rec. H.265 and ISO/IEC 23008-2 (HEVC), 2013, 317 pages.
Grange et al., "VP9 Bitstream & Decoding Process Specification", Version 0.6, Retrieved from https://storage.googleapis.com/downloads.webmprojecl.org/docs/vp9/vp9-bitstream-specification-v0.6-20160331-draft.pdf, 2016, 171 pages.
Suehring, Karsten, "H.264/AVC software", http:/iphome.hhi.de/suehring/tml/, retrieved May 17, 2020, 1 page.
"High Efficiency Video Coding (HEVC) I JCT-VG", Fraunhofer Heinrich Hertz Institute, hllps://hevc.hhi.fraunhofer.de, retrieved Apr. 17, 2020, 2 pages.
"Webproject / libvpx", https://github.com/webmprojecl/libvpx, retrieved Apr. 17, 2020, 5 pages.
Bjontegaard, Gisle, "Calculation of average psnr differences between rd curves," I T U-T Q.6/SG16 VCEG 13th meeting, https://www.itu.int/wflp3/av-arch/video-site/0104_Aus/VCEG-M33.doc, 2001, 4 pages.
Katsavounidis, Ioannis, "Netflix—"El Fuente" video sequence details and scenes", Jul. 28, 2015, http://www.cdvl.org/documents/ElFuente_summary.pdf, 64 pages.
Katsavounidis, Ioannis, "Netflix—"Chimera" video sequence details and scenes", https://www.cdvl.org/documents/NETFLIX_Chimera_4096x2160_Download_Instructions.pdf, Nov. 2, 2015, 189 pages.
Wang et al., "Image Quality Assessment: From Error Visibility to Structural Similarity", DOI:10.1109/TIP.2003.819861, IEEE Transactions on Image Processing, vol. 13, No. 4, Apr. 2004, pp. 600-612.
Sheikh et al., "Image Information and Visual Quality", DOI:10.1109/TIP.2005.859378, IEEE Transactions on ImageProcessing, vol. 15, No. 2, Feb. 2006, pp. 430-444.
Netflix / VMAF, https://github.com/Netflix/vmaf, retrieved Apr. 17, 2020, 4 pages.
Li et al., "Full-Reference Video Quality Assessment by Decoupling Detail Losses and Additive Impairments", DOI:10.1109/TCSVT.2012.2190473, Circuits and Systems for Video Technology, IEEE Transactions, vol. 22, No. 7, Jul. 2012, pp. 1100-1112.
Winkler, Stefan, "Analysis of Public Image and Video Databases for Quality Assessment", DOI:10.1109/JSTSP.2012.2215007, IEEE Journal of Selected Topics in Signal Processing, vol. 6, No. 6, Oct. 2012, pp. 516-625.
Cortes et al., "Support-Vector Networks", Machine Learning, vol. 20, 1995, pp. 273-297.
Katsavounidis, Ioannis, "Dynamic optimizer—a perceptual video encoding optimization framework", Netflix Technology Blog, https://netflixtechblog.com/dynamic-optimizer-a-perceptual-video-encoding-optimization-framework-e19f1e3a277f, Mar. 5, 2018, 22 pages.
Manohara et al., "Optimized shot-based encodes: Now streaming!", Netflix Technology Blog, https://netflixtechblog.com/optimized-shot-based-encodes-now-streaming-4b9464204830, Mar. 9, 2018, 9 pages.
"mirror / x264", https://github.com/mirror/x264, retrieved May 17, 2020, 1 page.
"FFmpeg / FFmpeg", https://github.com/FFmpeg/FFmpeg, retrieved May 17, 2020, 3 pages.
"videolan / x265", https://github.com/videolan/x265, retrieved May 17, 2020, 1 page.
"Eve-VP9 Maximize the Capabilities of VP9 for Your Video Streaming", Two Orioles, https://www.twoorioles.com/eve-vp9, retrieved May 17, 2020, 7 pages.
Netflix Technology Blog, https://netflixtechblog.com/per-title-encode-optimization-7e99442b62a2, Dec. 14, 2015, retrieved Feb. 20, 2018, 17 pages.
Wang et al., "Videoset: A large-scale compressed video quality dataset based on JND measurement", http://dx.doi.org/10.1016/j.jvcir.2017.04.009, Journal of Visual Communication and Image Representation, vol. 46, 2017, pp. 292-302.
Mareddy et al., "Simplifying Media Innovation at Netflix with Archer", Netflix Technology Blog, https://netflixtechblog.com/simplifying-media-innovation-at-netflix-with-archer-3f8cbb0e2bcb, Jun. 20, 2018, retrieved May 4, 2020, 20 bages.

(56) References Cited

OTHER PUBLICATIONS

Tan et al., "Video Quality Evaluation Methodology and Verification Testing of HEVC Compression Performance", IEEE Transactions on Circuits and Systems for Video Technology, XP011592174, DOI: 10.1109/TCSVT.2015.2477916, vol. 26, No. 1, Jan. 1, 2016, pp. 76-90.
Hanhart et al., "Calculation of average coding efficiency based on subjective quality scores", Journal of Visual Communication and Image Representation, Academic Press, XP028661468, http://dx.doi.org/10.1016/j.vcir.2013.11.008, vol. 25, No. 3, Dec. 4, 2013, pp. 555-564.
Ortega, Antonio, "Optimal bit allocation under multiple rate constraints", Proceedings of Data Compression conference—DCC '96, 10.1109/DCC.1996.488340, 1996, pp. 349-358.
Non Final Office Action received for U.S. Appl. No. 16/882,386 dated Mar. 28, 2022, 17 pages.
Non Final Office Action received for U.S. Appl. No. 17/170,661 dated Mar. 2, 2022, 44 pages.
Notice of Allowance received for U.S. Appl. No. 16/987,331 dated Apr. 20, 2022, 17 pages.
Non Final Office Action received for U.S. Appl. No. 15/902,970 dated Apr. 5, 2019, 53 pages.
Final Office Action received for U.S. Appl. No. 15/902,970 dated Oct. 31, 2019, 36 pages.
Non Final Office Action received for U.S. Appl. No. 15/902,971 dated Oct. 31, 2019, 40 pages.
Non Final Office Action received for U.S. Appl. No. 16/016,432 dated Sep. 13, 2019, 46 bages.
Non Final Office Action received for U.S. Appl. No. 16/053,754 dated Aug. 21, 2019, 22 pages.
Non Final Office Action received for U.S. Appl. No. 16/034,303 dated Jul. 10, 2019, 22 pages.
Non Final Office Action received for U.S. Appl. No. 15/902,975 dated Aug. 22, 2019, 26 pages.
Non Final Office Action received for U.S. Appl. No. 15/902,976 dated Jan. 2, 2020, 30 pages.
Notice of Allowance received for U.S. Appl. No. 16/034,303 dated Jan. 14, 2020, 15 pages.
Advisory Action received for U.S. Appl. No. 15/902,970 dated Feb. 10, 2020, 10 pages.
Final Office Action received for U.S. Appl. No. 15/902,971 dated Feb. 20, 2020, 45 pages.
Non Final Office Action received for U.S. Appl. No. 16/054,621 dated Mar. 5, 2020, 35 pages.
Final Office Action received for U.S. Appl. No. 16/053,754 dated Mar. 18, 2020, 23 pages.
Notice of Allowance received for U.S. Appl. No. 15/902,975 dated Mar. 4, 2020, 13 pages.
Non Final Office Action received for U.S. Appl. No. 15/902,970 dated Mar. 30, 2020, 45 pages.
Notice of Allowance received for U.S. Appl. No. 16/016,432 dated Apr. 1, 2020, 20 pages.
Non Final Office Action received for U.S. Appl. No. 15/902,971 dated Jul. 2, 2020, 36 pages.
Final Office Action received for U.S. Appl. No. 15/902,976 dated Jul. 10, 2020, 47 pages.
Non Final Office Action received for U.S. Appl. No. 16/543,476 dated Jul. 6, 2020, 55 pages.
Non Final Office Action received for U.S. Appl. No. 16/053,754 dated Aug. 12, 2020, 24 pages.
Final Office Action received for U.S. Appl. No. 16/054,621 dated Aug. 25, 2020, 29 pages.
Notice of Allowance received for U.S. Appl. No. 15/902,970 dated Sep. 4, 2020, 27 pages.
Notice of Allowance received for U.S. Appl. No. 16/054,621 dated Jan. 27, 2021, 13 pages.
Final Office Action received for U.S. Appl. No. 15/902,971 dated Dec. 10, 2020, 41 pages.
Notice of Allowance received for U.S. Appl. No. 15/902,976 dated Sep. 30, 2020, 8 pages.
Non Final Office Action received for U.S. Appl. No. 16/543,476 dated Jan. 7, 2021, 22 pages.
Final Office Action received for U.S. Appl. No. 16/053,754 dated Jan. 28, 2021, 25 pages.
Notice of Allowance received for U.S. Appl. No. 16/034,303 dated Dec. 4, 2019, 8 pages.
Non Final Office Action received for U.S. Appl. No. 16/882,386 dated Oct. 9, 2020, 29 pages.
Non Final Office Action received for U.S. Appl. No. 15/902,971 dated Mar. 17, 2021, 36 pages.
Notice of Allowance received for U.S. Appl. No. 16/054,621 dated Apr. 16, 2021, 15 pages.
Non Final Office Action received for U.S. Appl. No. 16/882,386 dated Apr. 6, 2021, 21 pages.
Notice of Allowance received for U.S. Appl. No. 16/054,621 dated Jun. 10, 2021, 14 pages.
Notice of Allowance received for U.S. Appl. No. 16/543,476 dated Jun. 25, 2021, 16 pages.
Notice of Allowance received for U.S. Appl. No. 15/902,971 dated Jul. 21, 2021, 17 pages.
Non Final Office Action received for U.S. Appl. No. 16/053,754 dated Jul. 16, 2021, 26 pages.
Non Final Office Action received for U.S. Appl. No. 16/987,331 dated Nov. 29, 2021, 54 pages.
Final Office Action received for U.S. Appl. No. 16/882,386 dated Sep. 30, 2021, 28 pages.
Final Office Action received for U.S. Appl. No. 16/053,754 dated Feb. 9, 2022, 18 pages.
Notice of Allowance received for U.S. Appl. No. 17/504,412 dated Jun. 1, 2023, 17 pages.
Notice of Allowance received for U.S. Appl. No. 17/170,661 dated Jul. 3, 2023, 25 pages.
Notice of Allowance received for U.S. Appl. No. 17/516,525 dated Jul. 12, 2023, 17 pages.
Non Final Office Action received for U.S. Appl. No. 16/053,754 dated Sep. 19, 2023, 18 pages.
Non Final Office Action received for U.S. Appl. No. 18/486,986 dated May 23, 2024, 35 pages.
Final Office Action received for U.S. Appl. No. 16/053,754 dated Mar. 18, 2024, 14 pages.
Non Final Office Action received for U.S. Appl. No. 16/053,754 dated Jul. 17, 2024, 15 pages.
Notice of Allowance received for U.S. Appl. No. 18/486,986 dated Sep. 11, 2024, 12 pages.
Notice of Allowance received for U.S. Appl. No. 16/053,754 dated Nov. 15, 2024, 21 pages.

* cited by examiner

Ladder Optimizer 140

Tradeoff Equation 410 =

$$\frac{bitrate(encoded\ higher\ resolution\ shot\ sequence) - bitrate(encoded\ lower\ resolution\ shot\ sequence)}{quality(encoded\ higher\ resolution\ shot\ sequence) - quality(encoded\ lower\ resolution\ shot\ sequence)}$$

Fixed Quantization Parameter (QP) 420 = 26

Resolution List 430 =
960x540
1280x720
1920x1080

Encoded Video Sequence 142(1)

| 960x540 shot sequence 132(1) encoded at QP = 26 | 960x540 shot sequence 132(2) encoded at QP = 26 | 1280x720 shot sequence 132(3) encoded at QP = 26 | 960x540 shot sequence 132(4) encoded at QP = 26 | 960x540 shot sequence 132(5) encoded at QP = 26 | 960x540 shot sequence 132(6) encoded at QP = 26 | 960x540 shot sequence 132(7) encoded at QP = 26 |

Encoded Video Sequence 142(2)

| 960x540 shot sequence 132(1) encoded at QP = 26 | 960x540 shot sequence 132(2) encoded at QP = 26 | 1920x1080 shot sequence 132(3) encoded at QP = 26 | 960x540 shot sequence 132(4) encoded at QP = 26 | 1280x720 shot sequence 132(5) encoded at QP = 26 | 960x540 shot sequence 132(6) encoded at QP = 26 | 1920x1080 shot sequence 132(7) encoded at QP = 26 |

Rung Specification 144(1)
Maximum Tradeoff 420(1) = 0.10

Rung Specification 144(2)
Maximum Tradeoff 420(2) = 0.15

FIGURE 4

TECHNIQUES FOR SELECTING RESOLUTIONS FOR ENCODING DIFFERENT SHOT SEQUENCES

CROSS-REFERENCE TO RELATED APPLICATIONS

This application is a continuation of the U.S. patent application titled, "TECHNIQUES FOR SELECTING RESOLUTIONS FOR ENCODING DIFFERENT SHOT SEQUENCES," filed on Feb. 22, 2018 and having Ser. No. 15/902,971, which claims the priority benefit of United States provisional patent application titled, "VIDEO ENCODING AT SCALE: PERCEPTUALLY OPTIMAL ENCODING OF VIDEO SEQUENCES," filed Feb. 23, 2017 and having Ser. No. 62/462,873, and also claims the priority benefit of United States provisional patent application titled, "ENCODING TECHNIQUE FOR OPTIMIZING DISTORTION AND BITRATE," filed Jul. 18, 2017 and having Ser. No. 62/534,170, this application also claims priority benefit to the U.S. Provisional Patent Application titled, "ENCODING TECHNIQUE FOR OPTIMIZING DISTORTION AND BITRATE," filed on Aug. 25, 2017 and having Ser. No. 62/550,517. The subject matter of these related applications is hereby incorporated herein by reference.

BACKGROUND

Field of the Invention

Embodiments of the present invention relate generally to video technology and, more specifically, to techniques for selecting resolutions for encoding different shot sequences.

Description of the Related Art

A typical video streaming service provides access to a library of media titles that can be viewed on a range of different endpoint devices. Each endpoint device may connect to the video streaming service under different connection conditions. Some notable connection conditions include, without limitation, bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a video streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best visual quality during playback of the media title on the endpoint device while avoiding playback interruptions due to buffering or rebuffering.

In some implementations, the endpoint application selects the particular encoded version of the media title based on a bitrate ladder. The bitrate ladder is designed to achieve a target visual quality during playback of a media title based on an available bitrate. Each rung in the bitrate ladder specifies a different bitrate-resolution pair corresponding to a different pre-generated encoded version of the media title. To generate the encoded version of a media title corresponding to a given bitrate-resolution pair, the video service provider samples the video content associated with the media title at the resolution to generate sampled video content. The video service provider then encodes the sampled video content based on encoding parameters associated with the bitrate.

One drawback of the above encoding technique is that the complexity of the video content associated with a given media title oftentimes varies across the media title, but the resolution and encoding parameters used to encode the video content do not vary. As a result, encoding relatively simple portions of the media title may consume more computational and storage resources than are necessary to meet the target visual quality. For example, a relatively simple portion of a media title could have the same visual quality regardless of whether that portion of video content is encoded using a bitrate of 8 megabits per second or encoded using a bitrate of 20 megabits per second. Such encoding inefficiencies not only needlessly waste computational and storage resources, these types of inefficiencies also unnecessarily increase the bandwidth required to stream encoded versions of media titles to endpoint devices.

As the foregoing illustrates, what is needed in the art are more effective techniques for encoding video content for streaming.

SUMMARY OF THE EMBODIMENTS

One embodiment of the present invention sets forth a computer-implemented encoding video sequences. The method includes partitioning a source video sequence associated with a media title into multiple subsequences that include a first subsequence and a second subsequence; generating a first encoded subsequence based on the first subsequence and a first resolution; generating a second encoded subsequence based on the second subsequence and a second resolution that is higher than the first resolution; and aggregating the first encoded subsequence and the second encoded subsequence to generate a first encoded video sequence, where at least a portion of the first encoded video sequence is subsequently streamed to an endpoint device during a playback of the media title.

At least one technological improvement of the disclosed techniques relative to prior art is that varying the resolution when encoding individual shot sequences included in an encoded video sequence reduces encoding inefficiencies associated with conventional encoding techniques. Such encoding inefficiencies not only needlessly waste computational and storage resources, these types of inefficiencies also unnecessarily increase the bandwidth required to stream encoded versions of media titles to endpoint devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a more detailed illustration of the ladder optimizer of FIG. 1, according to various embodiments of the present invention;

DETAILED DESCRIPTION

In the following description, numerous specific details are set forth to provide a more thorough understanding of the present invention. However, it will be apparent to one of skilled in the art that the present invention may be practiced without one or more of these specific details.

The disclosed techniques optimize operations associated with streaming encoded video sequences for viewing an associated source video sequence associated with a media title. Notably, an encoding optimization application implements one or more encoding optimization techniques based on shot changes. Each shot change separates a different pair of shot sequences. Each shot sequence includes a set of frames that usually have similar spatial-temporal properties and run for an uninterrupted period of time. First, a key frame optimizer partitions a source video sequence into multiple shot sequences based on the shot changes. In some embodiments, the key frame optimizer also determines optimized locations for key frames based on the shot changes. Each key frame is encoded interdependently of preceding frames. Subsequently, a ladder optimizer generates one or more encoded video sequences based on resolution and/or an encoding parameter that is individuality optimized for each shot sequence. Finally, a content engine generates encoded files based on the encoded video sequences and a file granularity (e.g., video sequence or shot sequence) and stores the encoded files in a content distribution network for distribution to endpoint devices.

Advantageously, during playback, the media title is switchable between decoded versions of different encoded video sequences at the key frames to optimize a viewing experience based on any number of relevant criteria. Examples of relevant criteria include the current connection bandwidth, the current connection latency, the content of the upcoming shot sequence, and the like. Further, encoding each shot sequence based on a resolution and encoding parameter(s) that are optimized for the shot sequence reduces inefficiencies associated with conventional encoding techniques. Finally, storing encoded individual shot sequences as individual files may reduce the total resources required to store the encoded video sequences.

System Overview

Figure 1:
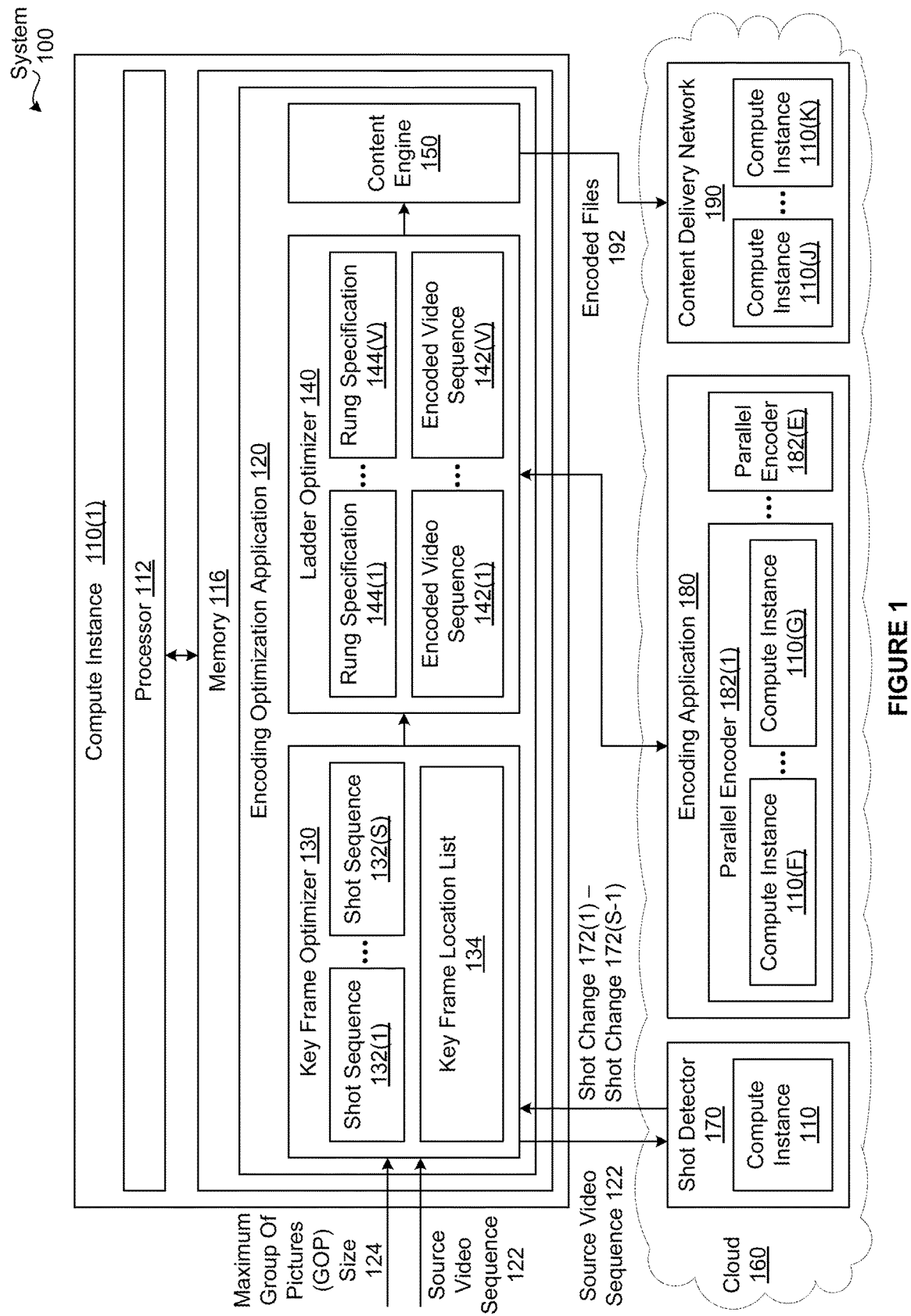
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, any number of compute instances 110 and a cloud 160. In general, the cloud 160 contains encapsulated shared resources, software, data, etc. For explanatory purposes, multiple instances of like objects are denoted with reference numbers identifying the object and parenthetical numbers identifying the instance where needed.

Any number of the compute instances 110 may reside outside the cloud 160 while other compute instances 110 may reside inside the cloud 160. In various embodiments, any number of the components of the system 100 may be distributed across multiple geographic locations. Further, any number of the components of the system 100 may be included in or distributed across one or more stand-alone device, distributed computing environments, or clouds 160 in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 are configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instances 110 are configured to generate any number of encoded video sequences 142 for the source video sequence 122. The source video sequence 122 includes, without limitation, any amount and type of video content that is associated with a media title. Examples of video content include, without limitation, any portion (including all) of feature length films, episodes of television programs, and music videos, to name a few. Each of the encoded video sequences 142 includes, without limitation, encoded video content derived from the video content included in the associated source video sequence 122.

Although not shown, a video streaming service provides access to a library of media titles that can be viewed on a range of different endpoint devices. The library of media titles includes without limitation, the media title associated with the source video sequence 122. Each endpoint device may connect to the video streaming service under different connection conditions. Some notable connection conditions include, without limitation, bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a video streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best visual quality during playback of the media title on the endpoint device while avoiding playback interruptions due to buffering or rebuffering.

In some conventional implementations, the endpoint application selects the particular encoded version of the media title based on a bitrate ladder. The bitrate ladder is designed to achieve a target visual quality during playback of a media title based on an available bitrate. Each rung in the bitrate ladder specifies a different bitrate-resolution pair corresponding to a different pre-generated encoded version of the media title. To generate the encoded version of a media title corresponding to a given bitrate-resolution pair, the video service provider samples the video content associated with the media title at the resolution to generate sampled video content. The video service provider then encodes the sampled video content based on encoding parameters associated with the bitrate.

One drawback of the above conventional encoding technique is that the complexity of the video content associated with a given media title oftentimes varies across the media title, but the resolution and encoding parameters used to encode the video content do not vary. As a result, encoding relatively simple portions of the media title may consume more computational and storage resources than are necessary to meet the target visual quality. For example, a relatively simple portion of a media title could have the same visual quality regardless of whether that portion of video content is encoded using a bitrate of 8 megabits per second or encoded using a bitrate of 20 megabits per second. Such encoding inefficiencies not only needlessly waste computational and storage resources, these types of inefficiencies also unnecessarily increase the bandwidth required to stream encoded versions of media titles to endpoint devices.

Optimizing Encoding Operations for Individual Shot Sequences

To address the above problems, the system 100 includes, without limitation, an encoding optimization application 120 that optimizes encoding operations for each shot sequence 132 included in the source video sequence 122. The source video sequence 122 includes, without limitation, any number of contiguous and non-overlapping shot sequences 132. Each of the shot sequences 132 includes a set of frames that usually have similar spatial-temporal properties and run for an uninterrupted period of time. The encoding optimization application 120 resides in one of the memories 116 and executes on one of the processors 112.

As shown, the encoding optimization application 120 includes, without limitation, a key frame optimizer 130, a ladder optimizer 140, and a content engine 150. Upon receiving the source video sequence 122, the key frame optimizer 130 determines one or more shot changes 172 included in the source video sequence 122. Each of the shot changes 172 specifies a boundary between a different pair of the shot sequences 132. The key frame optimizer 130 may determine the one or more shot changes 172 in any technically feasible fashion.

For instance, in some embodiments, the key frame optimizer 130 transmits the source video sequence 122 to a shot detector 170 that resides in the cloud 160. To determine the shot changes 172, the shot detector 170 executes any number of shot detection algorithms based on the source video sequence 122. Some examples of shot detection algorithms include, without limitation, a multi-scale sum-of-absolute-differences algorithm, a motion-compensated residual energy algorithm, a histogram of differences algorithm, a difference of histograms algorithm, and so forth. The shot detector 170 then transmits the shot changes 172 to the key frame optimizer 130. In alternate embodiments, the key frame optimizer 130 may perform any number of shot detection operations on the source video sequence 122 to determine the shot changes 172.

The key frame optimizer 130 performs partitioning operations on the source video sequence 122 based on the shot changes 172 to determine the shot sequences 132. In some embodiments, the key frame optimizer 130 also generates a key frame location list 134 based on the shot sequences 132. Each key frame location (not shown in FIG. 1) included in the key frame location list 134 specifies a location of a frame that is to be encoded as a key frame. A "key frame" and all subsequent frames from the same shot sequence included in the encoded video sequence 142 are decoded independently of any proceeding frames included in the encoded video sequence 142.

In operation, if the key frame optimizer 130 generates the key frame location list 134, then the ladder optimizer 140 ensures that the frames at the key frame locations included in the key frame location list 134 are encoded as key frames for all of the encoded videos sequences 142. The ladder optimizer 140 may ensure the frames at the key frame locations included in the key frame location list 134 are encoded as key frames in any technically feasible fashion. For instance, in some embodiments, the ladder optimizer 140 configures an encoding application 180 to encode frames as key frames based on the key frame location list 132 when encoding video content. In other embodiments, the ladder optimizer 140 may perform any number of encoding operations to encode frames as key frames based on the key frame location list 134 when encoding video content.

In this fashion, the key frame location list 134 ensures that each of the encoded video sequences 142 includes key frames that are aligned with the other encoded video sequences 142. As persons skilled in the art will recognize, during playback, the media title associated with the source video sequence 122 is switchable between decoded versions of the encoded video sequences 142 at aligned key frames to optimize a viewing experience based on any number of relevant criteria. Examples of relevant criteria include the current connection bandwidth, the current connection latency, the content of the upcoming shot sequence, and the like.

Figure 2:
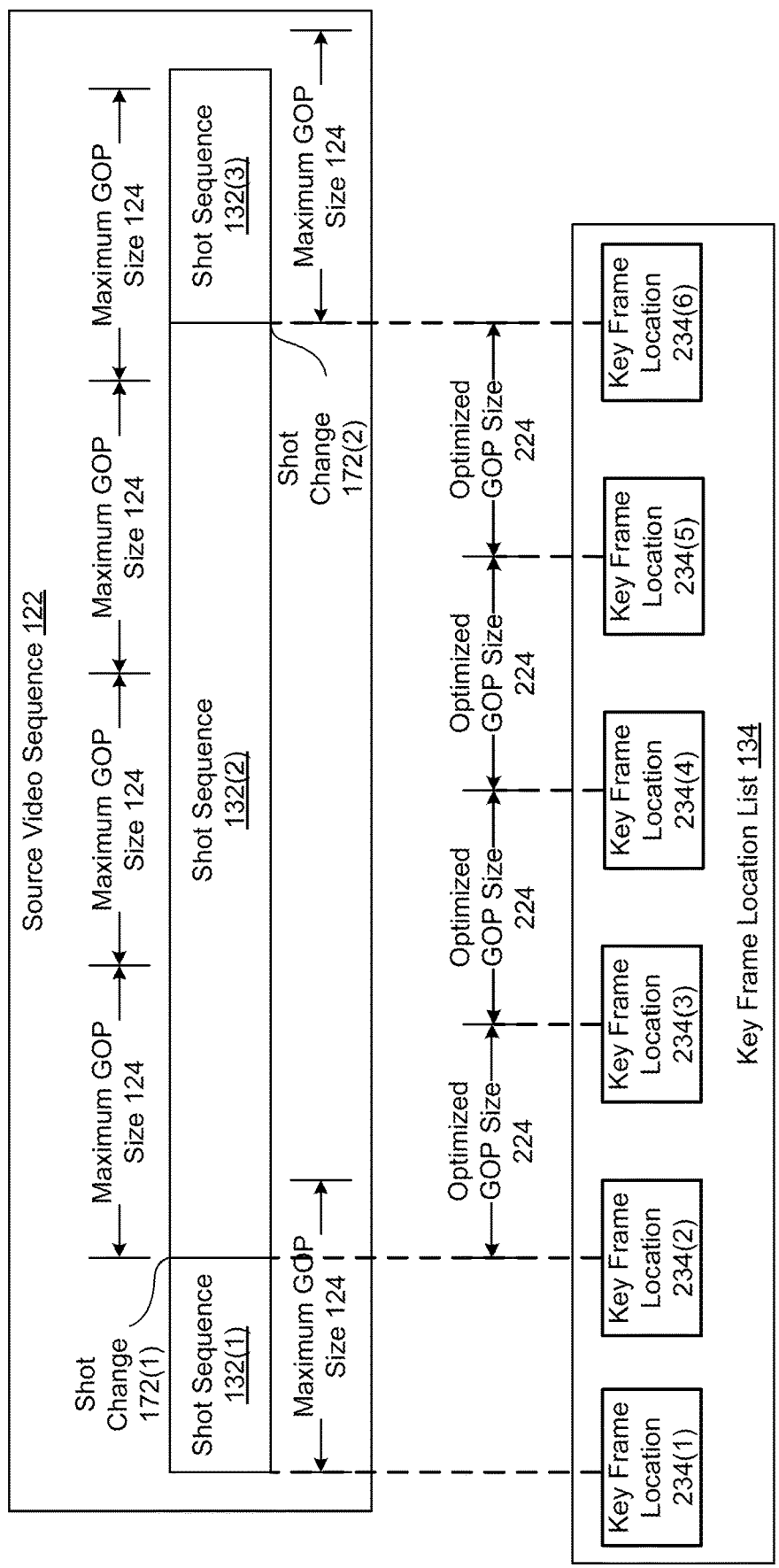
FIG. 2 illustrates an example of a key frame location list that is generated by the key frame optimizer of FIG. 1, according to various embodiments of the present invention.
Figure 3:
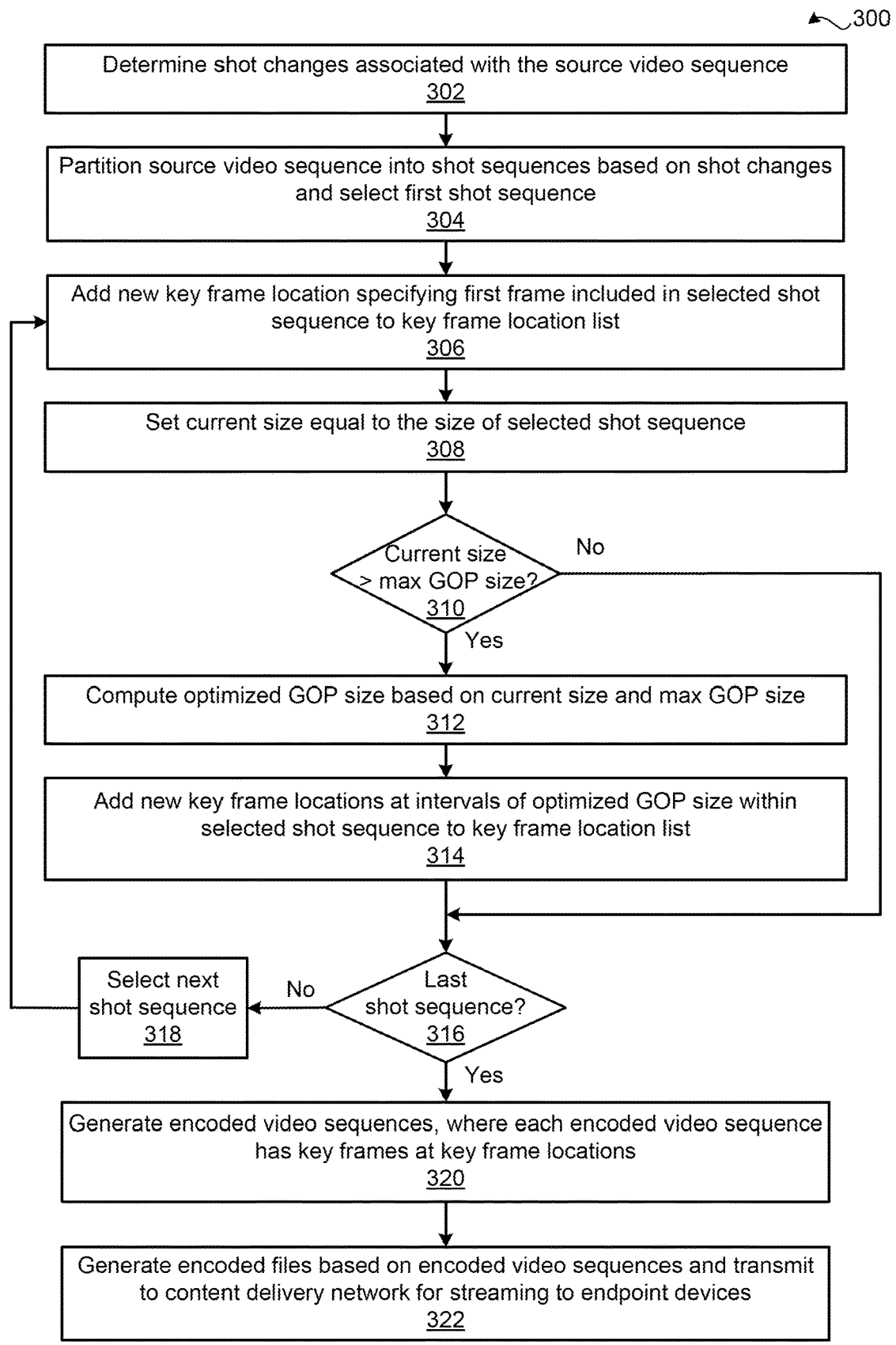
FIG. 3 is a flow diagram of method steps for positioning key frames within encoded video sequences, according to various embodiments of the present invention.

As described in detail in conjunction with FIGS. 2 and 3, for each of the shot sequences 132, the key frame optimizer 130 adds the location of the initial frame of the shot sequence 132 in the key frame location list 134. Further, for each of the shot sequences 132 that exceed a maximum group of picture (GOP) size 124, the key frame optimizer 130 adds the location(s) of one or more additional frames included in the shot sequence 132 to the frame location list 134. The key frame optimizer 130 may determine the maximum GOP size 124 in any technically feasible fashion. For example, the key frame optimizer 130 could receive the maximum GOP size 124 via a graphical user interface (GUI).

Upon receiving the shot sequences 132, the ladder optimizer 140 generates one or more encoded video sequences 142. For each of the shot sequences 132, a given encoded video sequence 142 includes, without limitation, an encoded shot sequence (not shown) that is associated with the shot sequence 132. Each of the encoded shot sequences includes encoded video content derived from the video content included in the associated shot sequence 132.

Each of the encoded video sequences 142 is associated with a different rung of an encoding ladder (not shown). Each of the rungs is associated with a different rung specification 144 and, consequently, each of the encoded video sequences 142 is associated with a different rung specification 144. Each of the rung specifications 144 includes, without limitation, any number of constraints. At least one of the constraints specifies a rung-specific threshold for a metric that varies based on at least one of the resolution and the encoding parameters. The ladder optimizer 140 ensures that each of the encoded shot sequences 142 included in the encoded video sequence 142 individually satisfies the associated rung specification 144.

To generate the encoded video sequence 142($x$), for each of the shot sequences 132, the ladder optimizer 140 generates an encoded shot sequence that meets the rung specification 144($x$). More precisely, for each of the shot sequences 132, the ladder optimizer 140 individually optimizes at least one of the resolution and the encoding parameter to ensure that the associated encoded shot sequence meets the rung specification 144($x$). Subsequently, the ladder optimizer 140 includes each of the encoded shot sequence in the encoded video sequence 142($x$).

In some "resolution optimization" embodiments, to generate each encoded shot sequence for the encoded video sequence 142($x$), the ladder optimizer 140 selects a potentially different resolution from a resolution list. The ladder optimizer 140 selects the resolution based on the rung specification 144($x$) and the video content included in the associated shot sequence 132. Consequently, the encoded video sequence 142($x$) could include one encoded shot sequence that is associated with a first resolution, seven encoded shot sequences that are associated with a second resolution, twelve encoded shot sequences that are associated with a third resolution, etc. The rung specification 144($x$) includes, without limitation, one or more encoding parameters and a constraint (also referred to herein as an "optimization constraint") specifying a rung-specific threshold for a metric that varies based on the selected resolution. The constraint may be specified in any technically feasible fashion based on any technically feasible metric. Further, the ladder optimizer 140 may select the resolution based on the constraint in any technically feasible fashion. Some resolution optimization embodiments are described in greater detail in conjunction with FIGS. 4 and 5.

In some "encoding parameter optimization" embodiments, to generate each encoded shot sequence for the encoded video sequence 142($x$), the ladder optimizer 140 selects a potentially different encoding parameter based on the rung specification 144($x$) and the video content included the associated shot sequence 132. Consequently, the encoded video sequence 142($x$) could include seven encoded shot sequences that are associated with a first encoding parameter, five encoded shot sequences that are associated with a second encoding parameter, and twelve encoded shot sequences that are associated with a third encoding parameter, etc. The rung specification 144($x$) includes, without limitation, a rung resolution and a constraint specifying a rung-specific threshold for a metric that varies based on the selected encoding parameter. The constraint may be specified in any technically feasible fashion based on any technically feasible metric. Further, the ladder optimizer 140 may select the encoding parameter based on the constraint in any technically feasible fashion. Some encoding parameter optimization embodiments are described in greater detail in conjunction with FIGS. 6 and 7.

As a general matter, the ladder optimizer 140 may generate encoded video content derived from video content based on a given resolution and given encoding parameters in any technically feasible fashion. For instance, in some embodiments, the ladder optimizer 140 performs sampling operations on the video content based on the resolution to generate sampled video content. Subsequently, the ladder optimizer 140 configures the encoding application 180 to perform encoding operations on the sampled video content based on the encoding parameters to generate the encoded shot sequence.

As shown, the encoding application 180 resides in the cloud 160 and is configured to efficiently perform encoding operations via one or more parallel encoders 182. Each of the parallel encoders 182 may include any number of computer instances 110. In alternate embodiments, the ladder optimizer 140 may perform encoding operations and the system 100 may omit the encoding application 180. In the same or other embodiments, the system 100 may include a sampling application, and the ladder optimizer 140 may configure the sampling application to perform sampling operations.

Notably, the ladder optimizer 140 may perform sampling operations and encoding operations at any level of granularity (e.g., per frame, per shot sequence, per video sequence, etc.) in any combination and in any technically feasible fashion. For instance, in some embodiments, the ladder optimizer 140 may perform sampling operations on the source video sequence 122 based on a first resolution to generate a sampled shot sequence. Subsequently, the ladder optimizer 140 may configure the encoding application 180 to encode the sampled video content corresponding to the shot sequence 132($x$) based on first encoding parameters. The resulting encoded video content is an encoded shot sequence associated with the shot sequence 132($x$), the first resolution, and the first encoding parameters.

The ladder optimizer 140 generates the encoded video sequence 142 associated with the rung based on the encoded shot sequences associated with the rung. The ladder optimizer 140 may generate the encoded video sequence 142 in any technically feasible fashion. For instance, in some embodiments, the ladder optimizer 140 adds each of the encoded shot sequences into the encoded video sequence 142. In other embodiments, the ladder optimizer 140 generates a monolithic encoded video sequence based on a first resolution and first encoding parameters. Subsequently, the ladder optimizer 140 replaces encoded video content included in the monolithic encoded video sequence with encoded shot sequence(s) generated based on different resolutions or encoding parameters.

The content engine 150 generates encoded files 192 based on the encoded video sequences 142 and a file granularity (not shown) that is one of video sequence or shot sequence. In alternate embodiments, the file granularity may specify any granularity in any technically feasible fashion. If the file granularity is shot sequence, then the content engine 150 analyzes all of the encoded video sequences 142 to identify the unique encoded shot sequences. For each unique encoded shot sequence, the content engine 150 generates a separate file and includes the file in the encoded files 182. In this fashion, the content engine 150 eliminates duplicate files. By contrast, if the file granularity is video sequence, then the content engine 150 generates a separate file for each of the encoded video sequences 142 and includes the files in the encoded files 182. Finally, the content engine 150 transmits the encoded files 192 to a content delivery network (CDN) 190 included in the cloud 160 for on-demand delivery to endpoint devices. In alternate embodiments, the content engine 150 may generate the encoded files 192 and cause the encode files 192 to be delivered to endpoint devices in any technically feasible fashion.

In some embodiments, the content engine 150 configures the CDN 190 to deliver metadata to the endpoint devices along with the encoded files 192. An example of metadata includes, without limitation, quality scores associated with encoded video content at any level of granularity. For example, the metadata could include, without limitation, quality scores associated with one or more encoded shot sequences and/or quality scores associated with one or more of the encoded video sequences 142. The content engine 150 may configure CDN 190 to deliver the quality scores to the endpoint devices in any technically feasible fashion. For instance, in some embodiments, the content engine 150 may provide metadata to the CDN 190 along with each encoded file included in the encoded files 192. Subsequently, as part of streaming an encoded file to an endpoint device, the CDN 190 may embed the metadata associated with the encoded file in the stream. In other embodiments, the content engine 150 may generate a manifest file that specifies the metadata and then transmit the manifest file to the CDN 190. Subsequently, when initializing a streaming session, the CDN 190 may transmit the manifest file to the endpoint device.

The endpoint devices may perform any type and amount of operations based on the metadata. In particular, the endpoint devices may perform any number and type of adaptive streaming operations in any technically feasible fashion. For example, an endpoint device could compute an average VMAFh score based on VMAFh scores specified in a manifest. Subsequently, the endpoint device could analyze the VMAFh scores in conjunction with any other relevant criteria (e.g., bitrate, available bandwidth, type of media title, viewer preferences, etc) to select a particular encoded video sequence 142 or encoded shot sequence or to switch between encoded video sequences 142 or encoded shot sequences.

Note that the techniques described herein are illustrative rather than restrictive, and may be altered without departing from the broader spirit and scope of the invention. Many modifications and variations on the functionality provided by the encoding optimization application 120, the key frame optimizer 130, the ladder optimizer 140, the content engine 150, the shot detector 170, the encoding application 180, and the content delivery network 190 will be apparent to those of ordinary skill in the art without departing from the scope and spirit of the described embodiments.

For instance, in some alternate embodiments, the key frame optimizer 130 may be configured to partition the source video sequence 122 into subsequences of frames that are not necessarily equivalent to the shot sequences 132. A subsequence of frames is also referred to herein as a "subsequence." A subsequence may represent a variety of different constructs, including a group of pictures (GOP), a sequence of one or more frames, a plurality of subsequences of frames, and so forth. In a complementary fashion, the key frame optimizer 130, the ladder optimizer 140, and the content engine 150 may be configured to operate on subsequences and encoded subsequences instead of the shot sequences 132 and encoded shot sequences. In general, the key frame optimizer 130 may be configured to identify subsequences in any technically feasible fashion. For example, the key frame optimizer 130 could be configured to identify and operate on subsequences for which a consistency metric lies within a specified range. The ladder optimizer 140 could then encode each subsequence at a different resolution or a different encoding parameter.

As persons skilled in the art will recognize, the techniques described herein may be modified to optimize audio encoding instead of video encoding. For example, in some embodiments, an audio track may be partitioned into "audio scenes." The audio scenes may be sampled via audio rendering hardware. The sampled audio scenes may be encoded via an audio codec that is configured via a quantization parameter and/or bitrate settings. The quality scores of the encoded audio scenes may be computed via a Perceptual Evaluation of Audio Quality (PEAQ) algorithm. Notably, the resolution and/or any number of encoding parameters may be optimized for each audio scene based on any of the techniques described herein in any combination.

It will be appreciated that the system 100 shown herein is illustrative and that variations and modifications are possible. For example the functionality provided by the encoding optimization application 120, the key frame optimizer 130, the ladder optimizer 140, the content engine 150, the shot detector 170, the encoding application 180, and the content delivery network 190, as described herein may be integrated into or distributed across any number of software applications (including one), hardware devices (e.g., a hardware-based encoder), and any number of components of the system 100. Further, the connection topology between the various units in FIG. 1 may be modified as desired.

FIG. 2 illustrates an example of a key frame location list 134 that is generated by the key frame optimizer 130 of FIG. 1, according to various embodiments of the present invention. As described in conjunction with FIG. 1, for each of the shot sequences 132, the key frame optimizer 130 adds a key frame location 234 specifying the location of the initial frame of the shot sequence 132 to the key frame location list 134. In addition, for each of the shot sequences 132 that exceeds the maximum group of picture (GOP) size 124, the key frame optimizer 130 adds one or more additional key frame locations 234 to the key frame location list 134, For each shot sequence 132 that exceeds the maximum GOP size 124, the key frame optimizer 130 adds the minimum number of additional key frames locations 234 to the key frame location list 234 to ensure that associated encoded shot sequences comply with the maximum GOP size 124. The size of the shot sequence 132 equals the number of frames included in the shot sequence 132. An encoded video sequence 142 that complies with the maximum GOP size includes no more than the maximum GOP size 124 of frames between any two adjacent key frames. Further, the key frame optimizer 130 spaces the additional key frame locations 234 at approximately equal intervals across the shot sequence 132.

More precisely, the key frame optimizer 130 divides the total number of frames included the shot sequence 132 by the maximum GOP size 124 to determine a quotient. The key frame optimizer 130 then performs a ceiling operation on the quotient to determine an optimized GOP size 224. The key frame optimizer 130 sets a current location equal to the location of the initial frame included in the shot sequence. The key frame optimizer 130 increments the current location by the optimized GOP size 224 and adds the key frame location 234 specifying the new current location to the key frame list 134. In this fashion, the key frame optimizer 130 continues to add key frame locations 234 to the key frame list 134 at intervals of the optimized GOP size 224 for the remainder of the shot sequence 132.

Notably, the optimized GOP size 224 may vary based on the shot sequence 132. However, within each shot sequence 132 that exceeds the maximum GOP size 124, the key frame optimizer 130 spaces the additional key frame locations 234 in a uniform fashion. Spacing the additional key frame locations 243 in a uniform fashion may decrease the maximum number of frames during which switching between the encoded video sequences 142 is not feasible.

For explanatory purposes only, FIG. 2 depicts an example source video sequence 122 that includes, without limitation, two shot changes 172(1)-172(2) and three shot sequences 132(1)-132(3). As shown, the size of the shot sequence 132(1) is smaller than the maximum GOP size 124. Accordingly, the key frame optimizer 130 adds the key frame location 234(1) specifying the location of the initial frame included in the shot sequence 132(1) to the key frame list 134.

The size of the shot sequence 132(2) exceeds the maximum GOP size 124. Accordingly, after adding the key frame location 234(2) specifying the location of the initial frame included in the shot sequence 132(2) to the key frame list 134, the key frame optimizer 130 computes the optimized GOP size 224 for the shot sequence 132(2). Based on the optimized GOP size 224, the key frame optimizer 130 adds the three key frame locations 234(3)-234(5) to the key frame list 134. Because the size of the shot sequence 132(3) is smaller than the maximum GOP size 124, the key frame optimizer adds a final key frame location 234(6) to the key frame list 134. The key frame location 234(6) specifies the location of the initial frame included in the shot sequence 132(3).

In alternate embodiments, the key frame optimizer 130 may determine any number of key frame locations 234 in any technically feasible fashion. Further, in some alternate embodiments, the key frame optimizer 130 partitions each of the shot sequences 132 that exceed the maximum GOP size 124 into multiple new shot sequences 132 based on the key frame locations 234. Accordingly, computing the optimized GOP size 224 results in an approximately even distribution of the frames across the new shot sequences 132.

Optimizing Key Frame Locations

FIG. 3 is a flow diagram of method steps for positioning key frames within encoded video sequences, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 302, where the key frame optimizer 130 determines the shot changes 172 included in the source video sequence 122. At step 304, the key frame optimizer 130 partitions the source video sequence 122 into the shot sequences 132 based on the shot changes 172. The key frame optimizer 130 then selects the first shot sequence 132.

At step 306, the key frame optimizer 130 adds a new key frame location 234 specifying the location of the initial frame included in the selected shot sequence 132 to the key frame location list 134. At step 308, the key frame optimizer 130 sets a current size equal to the size of the selected shot sequence 132. At step 310, the key frame optimizer 130 determines whether the current size exceeds the maximum GOP size 124. If, at step 310, the key frame optimizer 130 determines that the current size exceeds the maximum GOP size 124, then the method 300 proceeds to step 312.

At step 312, the key frame optimizer 130 computes the optimized GOP size 224 based on the current size and the maximum GOP size 124. At step 314, the key frame optimizer 130 adds one or more additional key frame locations 234 to the key frame location list 134. The additional key frame location(s) 234 specify location(s) at intervals of the optimized GOP size 224 within the selected shot sequence 132.

If, however, at step 310, the key frame optimizer 130 determines that the current size does not exceed the maximum GOP size 124, then the method 300 proceeds directly to step 316. At step 316, the key frame optimizer 130 determines whether the selected shot sequence 132 is the last shot sequence 132 included in the source video sequence 122. If, at step 316, the key frame optimizer 130 determines that the selected shot sequence 132 is not the last shot sequence 132 included in the source video sequence 122, then the method 300 proceeds to step 318. At step 318, the key frame optimizer 130 selects the next shot sequence 132 included in the source video sequence 122. The method 300 then returns to step 306, where the key frame optimizer 130 key frame optimizer 130 adds a new key frame location 234 specifying the location of the initial frame included in the selected shot sequence 132 to the key frame location list 134.

If, however, at step 316, the key frame optimizer 130 determines that the selected shot sequence 132 is the last shot sequence 132 included in the source video sequence 122, then the method 300 proceeds directly to step 320. At step 320, the ladder optimizer 140 generates the encoded video sequences 142. Each encoded video sequence 142 has key frames at the key frame locations 234 included in the key frame location list 134. At step 322, the content engine 150 generates the encoded files 192 based on the encoded video sequences 142. The content engine 150 then transmits the encoded video files 192 to the content delivery network 190 for streaming to endpoint devices. The method 300 then terminates.

Varying the Resolution when Generating Encoded Video Sequences

FIG. 4 is a more detailed illustration of the ladder optimizer 140 of FIG. 1, according to various embodiments of the present invention. As shown, the ladder optimizer 140 includes, without limitation, a tradeoff equation 410, a fixed quantization parameter (QP) 420, a resolution list 430, the rung specifications 144(1)-144(2), and the encoded video sequences 142(1)-144(2). As described in conjunction with FIG. 1, each of the rung specifications 144 is associated with a different rung in the encoding ladder. The ladder optimizer 140 generates the encoded video sequences 142(1)-144(2) based, respectively, on the rung specifications 144(1)-144(2). In alternate embodiments, the ladder optimizer 140 may generate N encoded video sequences 142, where N is any integer greater than zero, based on N rung specifications 144 in any technically feasible fashion.

The ladder optimizer 140 determines a tradeoff score associated with increasing the resolution at which a given shot sequence 132 is encoded from a lower resolution to a higher resolution based on the tradeoff equation 410. The tradeoff equation 410 specifies the tradeoff score for the higher resolution as the ratio of an increase in bitrate to an increase in quality score when increasing the resolution at which a given shot sequence 132 is encoded. Consequently, a relatively low tradeoff score indicates a relatively high advantage associated with encoding the shot sequence 132 at the higher resolution instead of the lower resolution.

In general, the ladder optimizer 140 may compute the bitrate and quality scores for encoded video content in any technically feasible fashion. In some embodiments, to determine the quality score associated with an encoded shot sequence, the ladder optimizer 140 decodes the encoded shot sequence to generate a decoded shot sequence. The ladder optimizer 140 then re-samples (i.e., upsampled or downsampled) the decoded shot sequence to a target resolution to generate a re-constructed shot sequence that is relevant to the display characteristics of a class of endpoint devices. Subsequently, the ladder optimizer 140 analyzes the re-constructed shot sequence to generate the quality score for a visual quality metric.

The quality scores may be associated with any visual quality metric. Example of visual quality metrics include, without limitation, a peak signal-to-noise-ratio PSNR), a linear video multimethod assessment fusion (VMAF) metric, and a harmonic VMAF (VMAFh), to name a few. For instance, in some embodiments the ladder optimizer 140 implements a VMAF (or harmonic VMAF) algorithm to generate a VMAF score for each re-constructed shot sequence.

Although a multitude of video quality metrics, such as VMAF scores, can be calculated at different target resolutions, it should be clear that, when comparing quality scores among encoded shot sequences associated with different resolutions, applications (e.g., the ladder optimizer 140) need to use the same target resolution for re-sampling, after decoding. For instance, in some embodiments, the ladder optimizer 140 re-samples the decoded shot sequence to 1920×1080 to generate the re-constructed shot sequence for each encoded shot sequence. Subsequently the ladder optimizer 140 computes the quality scores associated with different encoded shot sequence based on the re-constructed shot sequences.

In some embodiments, to compute the quality score for a given encoded shot sequence, the ladder optimizer 140 first computes linear VMAF scores for each frame included in the encoded shot sequence. Techniques for computing linear VMAF scores are known in the art and omitted for clarity. The ladder optimizer 140 then computes a harmonic VMAF score for the encoded shot sequence based on Equation 1:

$$VMAF_{harmonic} = \frac{N}{\sum_{n=0}^{N-1} \frac{1}{1+VMAF_n}} - 1 \qquad \text{Equation 1}$$

Equation 1 assumes that the encoded shot sequence includes N frames, indexed between 0 and N−1 (inclusive). VMAFn is the individual VMAF score for frame n, which has a value in the range [0,100]. The ladder optimizer 140 computes the final VMAFh score for the encoded shot sequence to also have a value in the range [0,100].

The fixed QP 420 specifies a value for a quantization parameter that allows a monotonic performance in terms of bitrate and distortion when encoding a video content. The higher the QP value, the lower the resulting bitrate at the expense of lower quality. The fixed QP 420 may be specified in any technically feasible fashion. For instance, the fixed QP 420 may be specified via a GUI. In alternate embodiments, the ladder optimizer 140 may determine the fixed QP 420 in any technically feasible fashion. Further, in various embodiments, the ladder optimizer 140 may implement a different fixed QP 420 for each rung in the encoding ladder.

The resolution list 430 specifies the list of resolutions at which the ladder optimizer 140 may encode the shot sequences 132. Each of the rung specifications 144 includes, without limitation, a maximum tradeoff 420. The maximum tradeoff 420 is a constraint specifying a rung-specific threshold for the tradeoff metric. In general, to generate each of the encoded shot sequences for the encoded video sequence 144(x), the ladder optimizer 140 selects a potentially different resolution from the resolution list 430 based on the rung specification 144(x) and the video content included the associated shot sequence 132. More specifically, for each shot sequence 132, the ladder optimizer 140 identifies the maximum resolution included the resolution list 430 for which the associated encoded shot sequence complies with the maximum tradeoff 420(x). Note that, by default, the ladder optimizer 140 determines that the lowest resolution included in the resolution list 430 complies with all of the maximum tradeoffs 420. The ladder optimizer 140 may identify the maximum resolutions in any technically feasible fashion.

For example, to encode the shot sequence 132(3) for the encoded video sequence 144(1), the ladder optimizer 140 encodes the shot sequence 132(3) at 960×540 (the lowest resolution included in the resolution list 430) and the fixed QP 420 of 26 to generate a 960×540 encode. The ladder optimizer 140 then encodes the shot sequence 132(3) at 1280×720 and the fixed QP 420 of 26 to generate a 1280×720 encode. The ladder optimizer 240 computes the bitrate and VMAFh score for the 960×540 encode as well as the bitrate and VMAFh score the 1280×720 encode. Subsequently, the ladder optimizer 140 computes the tradeoff score for increasing the resolution from 960×540 to 1280×720 based on the tradeoff equation 410, the bitrates, and the VMAFh scores. The ladder optimizer 140 determines that the tradeoff score for increasing the resolution from 960×540 to 1280×720 is less than the maximum tradeoff 420(1) of 0.1. Because the ladder optimizer 140 has not yet determined whether 1280×720 is the highest resolution that complies with the maximum tradeoff 420(1), the ladder optimizer 140 sets the current encoding resolution equal to 1280×720.

The ladder optimizer 140 then encodes the shot sequence 123(3) at 1920×1080 and the fixed QP 420 of 26 to generate a 1920×1080 encode. The ladder optimizer 140 determines that the tradeoff score for increasing the resolution from 1280×720 to 1920×1080 exceeds the maximum tradeoff 420(1) of 0.1. Consequently, the ladder optimizer 140 selects the resolution of 1280×720 as the resolution for the encoded shot sequence derived from the shot sequence 132(3). Accordingly, the ladder optimizer 140 includes the 1280×720 encode in the encoded video sequence 142(1). The 1280×720 encode is depicted in the encoded video sequence 142(1) as a box with horizontal lines.

In this fashion, the ladder optimizer 140 generates the encoded video sequence 142(1) that includes, without limitation, six encoded shot sequences associated with 960×540 and one shot sequence associated with 1280×720. Since the rung specification 420(2) specifies the maximum tradeoff 420(2) of 0.15, the ladder optimizer 140 generates the encoded video sequence 142(2) that differs from the encoded video sequence 142(1). The encoded video sequence 142(2) includes, without limitation, four encoded shot sequences associated with 960×540, one encoded shot sequence associated with 1280×720, and two encoded shot sequences associated with 1920×1080.

In alternate embodiments, the ladder optimizer 140 may compute the tradeoff score in any technically feasible fashion. For instance, in some alternate embodiments, the ladder optimizer 140 performs frequency spectrum analysis operations to determine the tradeoff score. For each shot sequence 132 included in the source video sequence, the ladder optimizer 140 computes a two-dimensional frequency spectrum for a sample shot included in the shot sequence. The ladder optimizer 140 may compute the frequency spectrum in any technically feasible fashion. For instance, in some embodiments, the ladder optimizer 140 generates a fast Fourier transform (FFT) of the sample shot. The ladder optimizer 140 then performs comparison operations between the amounts of energy included in the higher frequencies to the amount of energy included in the center frequency to determine the tradeoff scores for different resolutions included in the resolution list 430.

Note that the techniques described herein are illustrative rather than restrictive, and may be altered without departing from the broader spirit and scope of the invention. Many modifications and variations on the functionality provided by the ladder optimizer 140 will be apparent to those of ordinary skill in the art without departing from the scope and spirit of the described embodiments. For instance, in some embodiments, the fixed QP 410 is replaced by any number of fixed encoding parameters.

Figure 5:
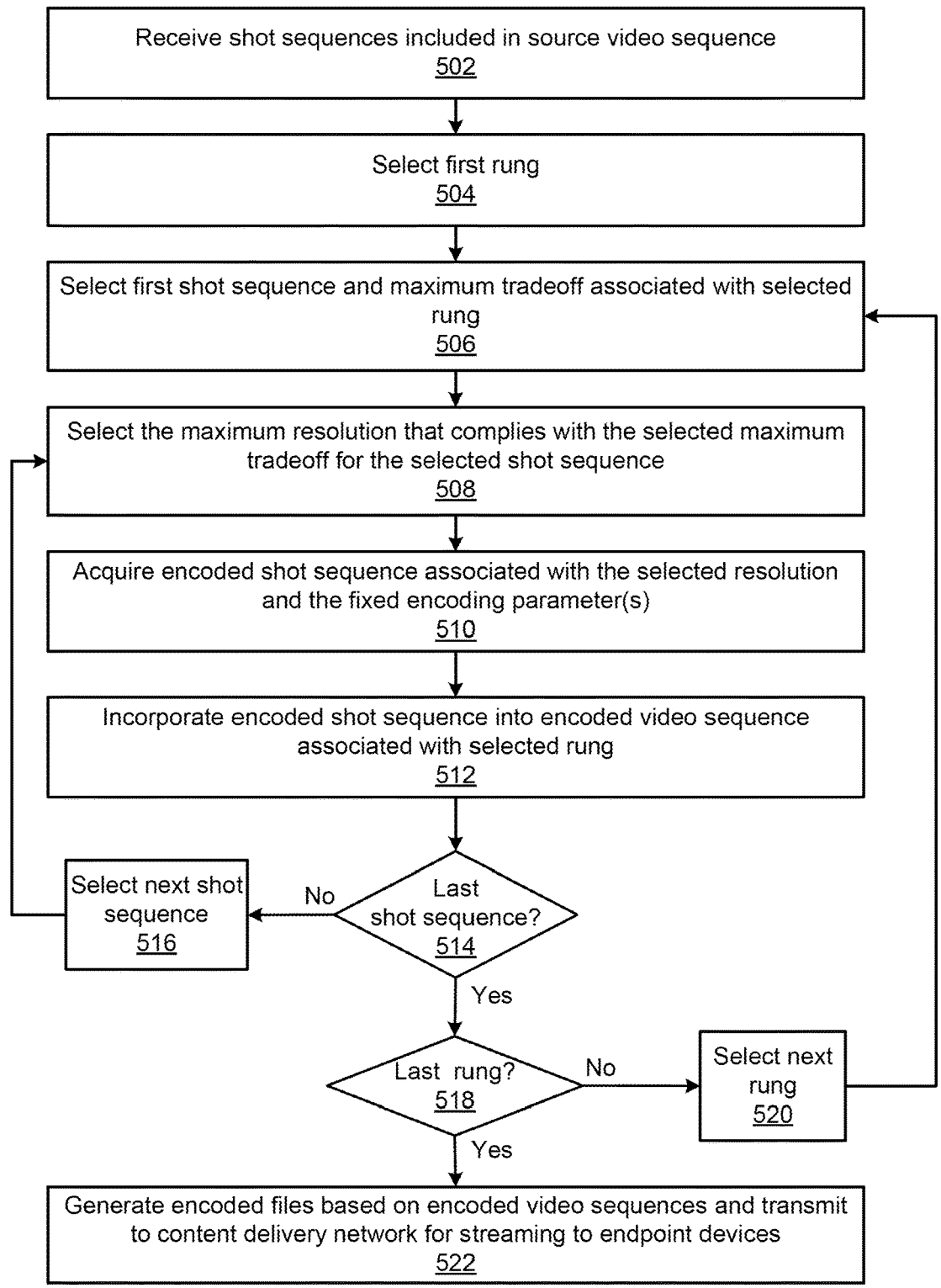
FIG. 5 is a flow diagram of method steps for encoding a source video sequence, according to various embodiments of the present invention.

FIG. 5 is a flow diagram of method steps for encoding a source video sequence, according to various embodiments of the present invention. Although the method steps are described with reference to the systems of FIGS. 1 and 4, persons skilled in the art will understand that any system configured to implement the method steps, in any order, falls within the scope of the present invention.

As shown, a method 500 begins at step 502, where the ladder optimizer 140 receives the shot sequences 132 included in the source video sequence 122. At step 504, the ladder optimizer 140 selects the first rung included in the encoding ladder. At step 506, the ladder optimizer 140 selects the maximum tradeoff 420 associated with the selected rung and selects the first shot sequence 132 included in the source video sequence 122.

At step 508, the ladder optimizer 140 identifies the maximum resolution included in the resolution list 320 for which the encoded shot sequence derived from the selected shot sequence 132 complies with the selected maximum tradeoff 420. Notably, the encoded shot sequence is encoded at fixed encoding parameter(s) irrespective of the resolution. The ladder optimizer 140 may identify the maximum compliant resolution in any technically feasible fashion. For instance, in some embodiments, the ladder optimizer 140 may determine the maximum resolution based on the tradeoff equation 410. In other embodiments, the ladder optimizer 140 may perform frequency spectrum analysis operations on a sample frame included in the selected shot sequence 132 to determine the maximum resolution.

At step 510, the ladder optimizer 140 acquires the encoded shot sequence associated with the selected shot sequence 132, the selected resolution, and the fixed encoding parameter(s). The ladder optimizer 140 may acquire the encoded shot sequence in any technically feasible fashion.

For instance, if the ladder optimizer 140 selects the resolution based on the tradeoff equation 410, then the ladder optimizer 140 re-uses the encoded shot sequence generated as part of step 508. By contrast, if the ladder optimizer 140 performs frequency spectrum analysis operations to select the resolution, then the ladder optimizer 140 samples the selected shot sequence 120 at the selected resolution to generate sampled video content. The ladder optimizer 140 then configures the encoding application 180 to encode the sampled video content at the fixed encoding parameter(s).

At step 512, the ladder optimizer 140 incorporates the encoded shot sequence into the encoded video sequence 142 associated with the selected rung. At step 514, the ladder optimizer 140 determines whether the selected shot sequence 132 is the last shot sequence 132 included the source video sequence 122. If, at step 514, the ladder optimizer 140 determines that the selected shot sequence 132 is not the last shot sequence 132 included in the source video sequence 122, then the method 500 proceeds to step 516. At step 516, the ladder optimizer 140 selects the next shot sequence 132 included in the source video sequence 122. The method 500 then returns to step 508, where the ladder optimizer 140 selects the resolution for the new selected shot sequence 132.

If, however, at step 516, the ladder optimizer 140 determines that the selected shot sequence 132 is the last shot sequence 132 included in the source video sequence 122, then the method 500 proceeds directly to step 518. At step 518, the ladder optimizer 140 determines whether the selected rung is the last rung included the encoding ladder. If, at step 518, the ladder optimizer 140 determines that the selected rung is not the last rung included in the encoding ladder, then the method 500 proceeds to step 520. At step 520, the ladder optimizer 140 selects the next rung included in the encoding ladder. The method 500 then returns to step 506, where the source video sequence selects the first shot sequence 132 included in the source video sequence 122 and the maximum tradeoff 420 associated with the selected rung.

If, however, at step 518, the ladder optimizer 140 determines the selected rung is the last rung included in the encoding ladder, then the method 500 proceeds directly to step 522. At step 522, the content engine 150 generates the encoded files 192 based on the encoded video sequences 142. The content engine 150 transmits the encoded video files 192 to the content delivery network 190 for streaming to endpoint devices. The method 500 then terminates.

Varying an Encoding Parameter when Generating Encoded Video Sequences

Figure 6:
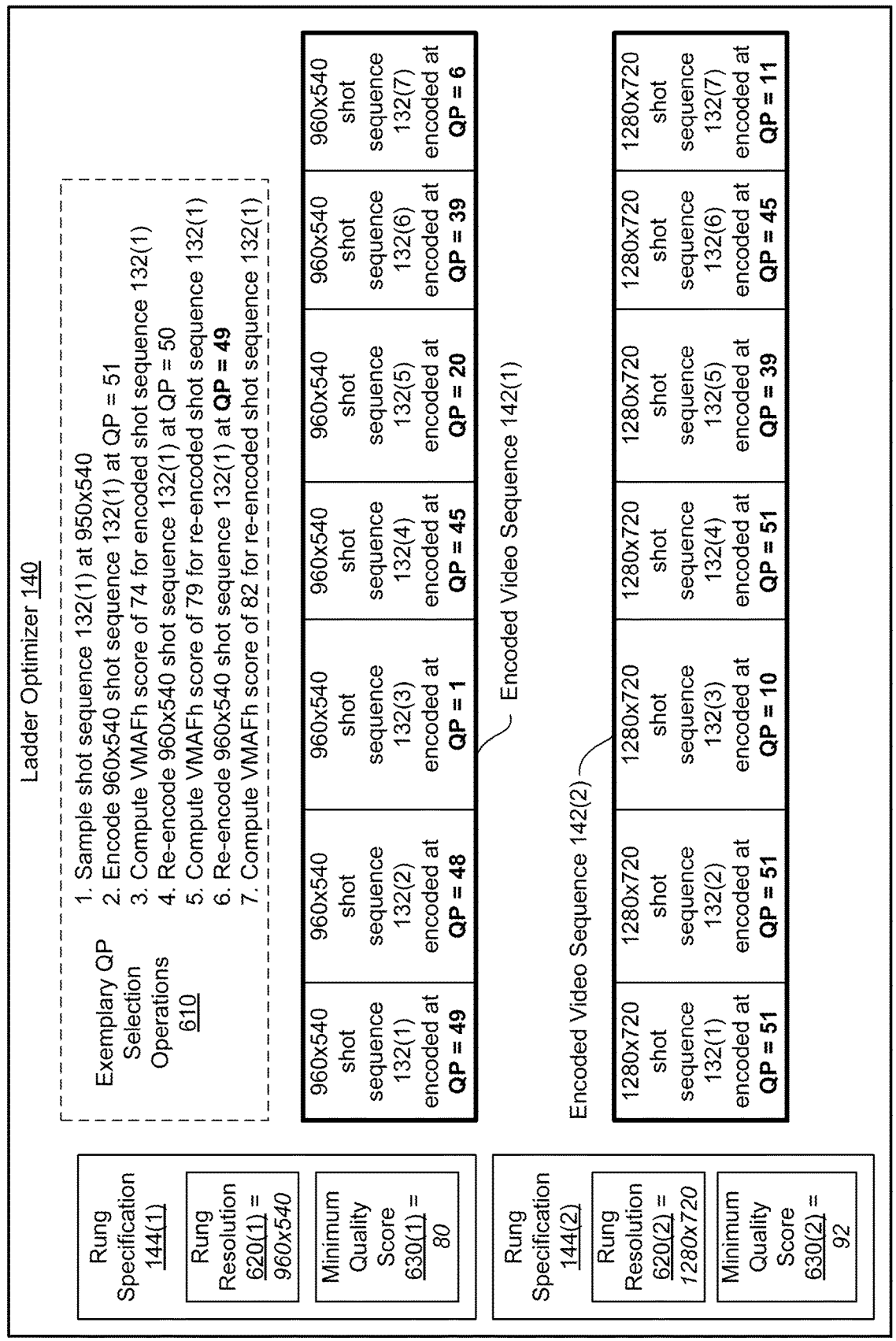
FIG. 6 is a more detailed illustration of the ladder optimizer of FIG. 1 configured to vary a quantization parameter (QP) across a source video sequence, according to various embodiments of the present invention.

FIG. 6 is a more detailed illustration of the ladder optimizer 140 of FIG. 1 configured to vary a quantization parameter (QP) across the source video sequence 122, according to various embodiments of the present invention. As shown, the ladder optimizer 140 includes, without limitation, the rung specifications 144(1)-144(2) and the encoded video sequences 142(1)-142(2).

As described in conjunction with FIG. 1, each of the rung specifications 144 is associated with a different rung in the encoding ladder. The ladder optimizer 140 generates the encoded video sequences 142(1)-144(2) based, respectively, on the rung specifications 144(1)-144(2). In alternate embodiments, the ladder optimizer 140 may generate N encoded video sequences 142, where N is any integer greater than zero, based on N rung specifications 144 in any technically feasible fashion.

Each of the rung specifications 144 includes, without limitation, a rung resolution 620 and a minimum quality score 630. As shown, the rung specification 144(1) specifies a rung resolution 620(1) of 960×540 and a minimum quality score 630(1) of 80. The rung specification 144(2) specifies a rung resolution 620(2) of 1280×720 and a minimum quality score 630(2) of 92. The quality scores may be associated with any visual quality metric. Example of visual quality metrics include, without limitation, a peak signal-to-noise-ratio (PSNR), a linear video multimethod assessment fusion ((VMAF) metric, and a harmonic VMAF (VMAFh), to name a few. The ladder optimizer 140 may compute the quality scores for encoded video content in any technically feasible fashion. One technique for generating VMAFh scores is described in conjunction with FIG. 4.

In general, to generate each encoded shot sequence for the encoded video sequence 142(x), the ladder optimizer 140 selects a potentially different encoding parameter based on the rung specification 144(x) and the video content included the associated shot sequence 132. For explanatory purposes only, exemplary QP selection operations 610 illustrate operations that the ladder optimizer 140 performs to select the QP for the encoded shot sequence derived from the shot sequence 132(1) and included in the encoded video sequence 142(1).

First, the ladder optimizer 140 samples the source video content at the rung resolution 620(1) of 920×540 to generate sampled shot sequences for each of the shot sequences 132. The ladder optimizer 140 then selects the sampled shot sequence associated with the shot sequence 132(1). The ladder optimizer 140 sets a current QP to an initial maximum QP allowed by the video codec used. For example, in the case of H.264/AVC, the ladder optimizer 140 selects a current QP of 51, and encodes the selected shot sequence at the current QP of 51 to generate a first encoded shot sequence. In alternate embodiments, the ladder optimizer 140 may implement any initial QP in any technically feasible fashion. For instance, in some embodiments the ladder optimizer 140 may implement an initial QP of the middle QP allowed by the video codec used. For example, in the case of H.264/AVC, the middle QP allowed is 26.

The ladder optimizer 140 computes the VMAFh score of 74 for the first encoded shot sequence. Because the VMAFh score of 74 is smaller than the minimum quality score 630(1) of 80, the ladder optimizer 140 determines that the first encoded shot sequence does not satisfy the rung specification 144(1). The ladder optimizer 140 then sets the current QP to a new QP. More specifically, the ladder optimizer 140 decrements the current QP of 51 to generate the current QP of 50. In alternate embodiments, the ladder optimizer 140 may determine a new current QP in any technically feasible fashion.

For instance, in some embodiments, the ladder optimizer 140 subtracts 2 from the current QP to generate a new current QP. In other embodiments, the ladder optimizer 140 sets the new current QP based on a binary search algorithm. In such embodiments, instead of setting the new current QP equal to 50, the ladder optimizer 140 may set the new current QP equal to 26.

The ladder optimizer 140 re-encodes the selected sampled shot sequence at the current QP of 50 to generate a second encoded shot sequence. Subsequently, the ladder optimizer 140 computes the VMAFh score of 79 for the second encoded shot sequence. Because the VMAFh score of 70 is less than the minimum quality score 630(1) of 80, the ladder optimizer 140 determines that the second encoded shot sequence does not satisfy the rung specification 144(1). The ladder optimizer 140 then sets the current QP to a new QP. More specifically, the ladder optimizer 140 decrements the current QP of 50 to generate the new QP of 49.

The ladder optimizer 140 re-encodes the selected sampled shot sequence at the current QP of 49 to generate a third encoded shot sequence. Subsequently, the ladder optimizer 140 computes the VMAFh score of 82 for the third encoded shot sequence. Because the VMAFh score of 82 is greater than the minimum quality score 630(1) of 80, the ladder optimizer 140 determines that the third encoded shot sequence satisfies the rung specification 144(1). Consequently, the ladder optimizer 140 adds the third encoded shot sequence to the encoded video sequence 142(1) as the encoded video sequence corresponding to the shot sequence 132(1).

In this fashion, the ladder optimizer 140 generates the encoded video sequence 142(1) that includes, without limitation, seven encoded shot sequences associated with 960× 540 and QPs ranging from 6 to 49. Further, the ladder optimizer 140 generates the encoded video sequence 142(2) that includes, without limitation, seven encoded sequences associated with 1280×720 and QPs ranging from 10 to 51.

Note that the techniques described herein are illustrative rather than restrictive, and may be altered without departing from the broader spirit and scope of the invention. Many modifications and variations on the functionality provided by the ladder optimizer 140 will be apparent to those of ordinary skill in the art without departing from the scope and spirit of the described embodiments. For instance, in alternate embodiments the ladder optimizer 140 may vary any number of encoding parameters based on any number and type of constraints included in the rung specifications 144.

Figure 7:
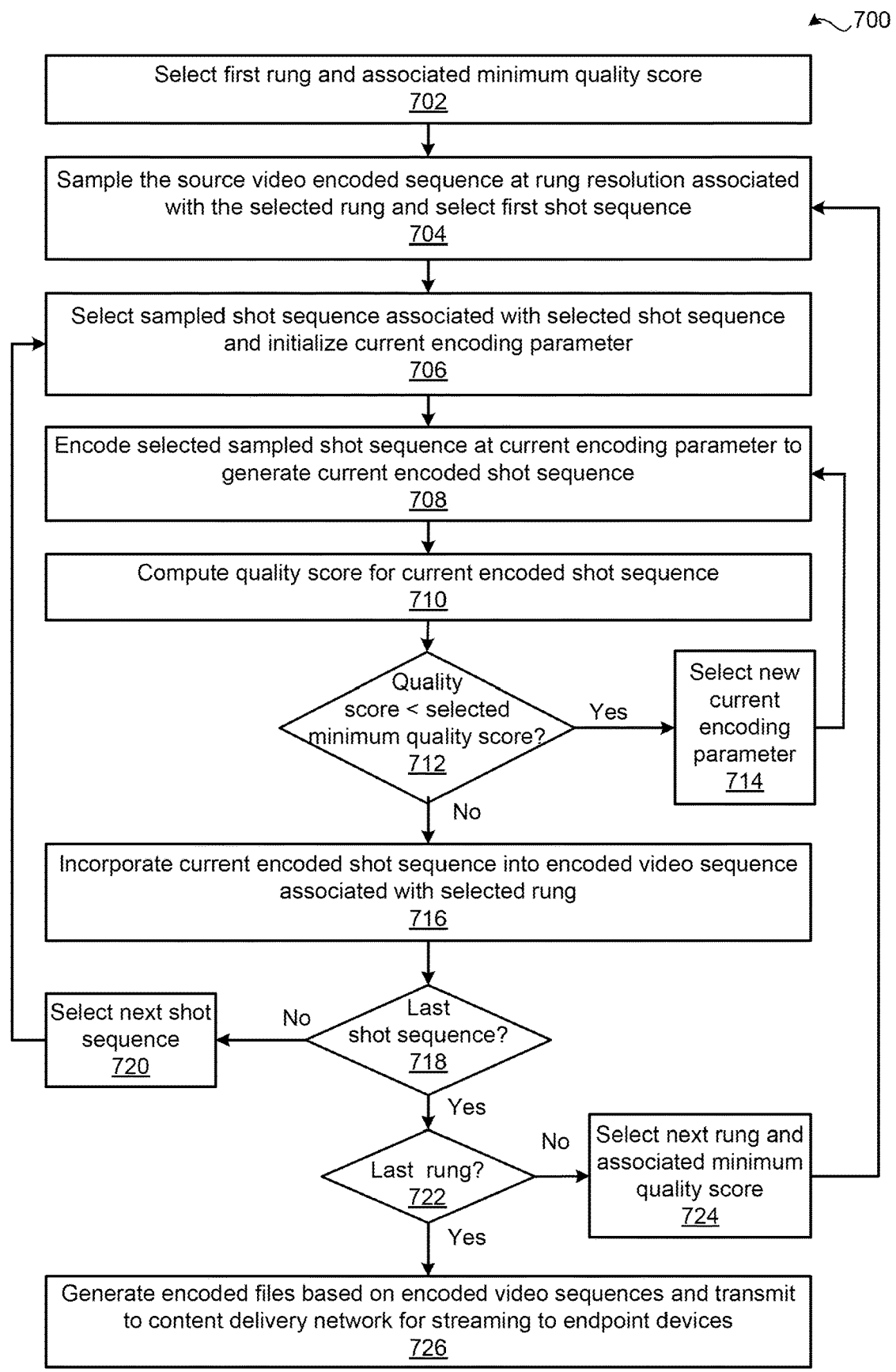
FIG. 7 is a flow diagram of method steps for varying an encoding parameter when encoding a source video sequence, according to various embodiments of the present invention.

FIG. 7 is a flow diagram of method steps for varying an encoding parameter when encoding a source video sequence, according to various embodiments of the present invention. Although the method steps are described with reference to the systems of FIGS. 1, and 6, persons skilled in the art will understand that any system configured to implement the method steps, in any order, falls within the scope of the present invention.

As shown, a method 700 begins at step 702, where the ladder optimizer 140 selects the first rung included in the encoding ladder and the associated minimum quality score 630. At step 704, the ladder optimizer 140 samples the source video sequence 122 at the rung resolution 620 associated with the selected rung and selects the first shot sequence 132 included in the source video sequence 122. At step 706, the ladder optimizer 140 selects the sampled shot sequence associated with the selected shot sequence 132 and initializes a current encoding parameter.

At step 708, the ladder optimizer 140 encodes the selected sampled shot sequence at the current encoding parameter to generate a current encoded shot sequence. At step 710, the ladder optimizer 140 computes a quality score for the current encoded shot sequence. At step 712, the ladder optimizer 140 determines whether the quality score is less than the selected minimum quality score 620. If, at step 712, the ladder optimizer 140 determines that the quality score is less than the selected minimum quality score 620, then the method 700 proceeds to step 714. At step 714, the ladder optimizer 140 selects a new current encoding parameter. The method 700 then returns to the step 708, where the ladder optimizer 140 encodes the selected sampled shot sequence at the new current encoding parameter.

If, however, at step 712, the ladder optimizer 140 determines that the quality score is greater than or equal to the minimum quality score 620, then the method 700 proceeds directly to step 716. At step 716, the ladder optimizer 140 incorporates the current encoded shot sequence into the encoded video sequence 142 associated with the selected rung. At step 718, the ladder optimizer 140 determines whether the current shot sequence 132 is the last shot sequence 132 included in the source video sequence 122.

If, at step 718, the ladder optimizer 140 determines that the selected shot sequence 132 is not the last shot sequence 132 included in the source video sequence 122, then the method 700 proceeds to step 720. At step 720, the ladder optimizer 140 selects the next shot sequence 132 included in the source video sequence 122. The method 700 then returns to step 706, where the ladder optimizer 140 selects the sampled shot sequence associated with the selected shot sequence 132 and initializes a current encoding parameter.

If, however, at step 718, the ladder optimizer 140 determines that the selected shot sequence 132 is the last shot sequence 132 included in the source video sequence 122, then the method 700 proceeds directly to step 722. At step 722, the ladder optimizer 140 determines whether the selected rung is the last rung included the encoding ladder. If, at step 722, the ladder optimizer 140 determines that the selected rung is not the last rung included in the encoding ladder, then the method 700 proceeds to step 724. At step 724, the ladder optimizer 140 selects the next rung included in the encoding ladder and the associated minimum quality score 630. The method 700 then returns to step 704, where the ladder optimizer 140 samples the source video sequence 122 at the rung resolution 620 associated with the selected rung.

If however, at step 722, the ladder optimizer 140 determines that the selected rung is the last rung included in the encoding ladder, then the method 700 proceeds directly to step 726. At step 726, the content engine 170 generates the encoded files 192 based on the encoded video sequences 142. The content engine 170 then transmits the encoded video files 192 to the content delivery network 190 for streaming to endpoint devices. The method 700 then terminates.

In sum, the disclosed techniques enable optimization of a viewing experience when playing back a source video sequence via streaming. An encoding optimization application includes, without limitation, a key frame optimizer, a ladder optimizer, and a content engine. First, a key frame optimizer partitions a source video sequence into multiple shot sequences based on shot changes. Each shot change separates a different pair of shot sequences. Each shot sequence includes a set of frames that usually have similar spatial-temporal properties and run for an uninterrupted period of time. The key frame optimizer may determine the shot changes in any technically feasible fashion.

In some embodiments, the key frame optimizer also determines optimized locations for key frames based on the shot changes. Each key frame is encoded interdependently of preceding frames. For each shot sequence, the key frame optimizer adds the location of the initial frame of the shot sequence to a key frame location list. Further, for each shot sequence having a size greater than a maximum group of pictures (GOP) size, the key frame optimizer determines an optimal GOP size. To determine the optimal GOP size for a given shot sequence, the key frame optimizer divides the number of frames included in the shot sequence by the optimal GOP size to generate a quotient. The key frame optimizer then performs a ceiling operation on the quotient. The key frame optimizer then adds additional locations at intervals of the optimal GOP size within the shot sequence to the key frame location list. Subsequently, the ladder optimizer configures an encoding application to encode frames at the key frame locations as key frames when performing encoding operations on video content associated with the source video sequence.

After receiving the shot sequences from the key frame optimizer, the ladder optimizer generates one or more encoded video sequences based on a combination of resolution and encoding parameters that the ladder optimizer may vary for each shot sequence. Notably, each encoded video sequence is associated with a different rung included in an encoding ladder. Each rung is also associated with a rung specification that includes at least one constraint. The ladder optimizer ensures that each encoded shot sequence included in a given encoded video sequence individually meets the associated rung specification.

In some encoding parameter optimization embodiments, to generate each encoded shot sequence for a given encoded video sequence, the ladder optimizer selects a potentially different resolution based on the associated rung specification and the video content included the associated shot sequence. Consequently, the resulting encoded video sequence could include one encoded shot sequence that is associated with a first resolution, seven encoded shot sequences that are associated with a second resolution, twelve encoded shot sequences that are associated with a third resolution, etc. The rung specification specifies one or more encoding parameters and a constraint specifying a threshold for a metric that varies based on the selected resolution. The constraint may be specified in any technically feasible fashion based on any technically feasible metric. Further, the ladder optimizer may select the resolution based on the constraint in any technically feasible fashion.

In some embodiments, to generate each encoded shot sequence for a given encoded video sequence, the ladder optimizer selects a potentially different encoding parameter based on the associated rung specification and the video content included the associated shot sequence. Consequently, the encoded video sequence could include seven encoded shot sequences that are associated with a first encoding parameter, five encoded shot sequences that are associated with a second encoding parameter, and twelve encoded shot sequences that are associated with a third encoding parameter, etc. The associated rung specification specifies a resolution and a constraint specifying a threshold for a metric that varies based on the selected encoding parameter. The constraint may be specified in any technically feasible fashion based on any technically feasible metric. Further, the ladder optimizer 140 may select the encoding parameter based on the constraint in any technically feasible fashion.

For each rung, the ladder optimizes aggregates the different encoded shot sequences associated with the rung to generate the encoded video sequence. Finally, the content engine generates encoded files based on the encoded video sequences and a file granularity (e.g., video sequence or shot sequence) and stores the encoded files in a content distribution network for distribution to endpoint devices. If the content engine generates the encoded files at the file granularity of shot sequences, then the content engine eliminates duplicates and generates a single copy for each encoded shot sequence associated with the same resolution and encoding parameters.

At least one technological improvement relative to prior art is that varying the resolution and/or encoding parameters when encoding individual shot sequences included in an encoded video sequence reduces encoding inefficiencies associated with conventional encoding techniques. Such encoding inefficiencies not only needlessly waste computational and storage resources, these types of inefficiencies also unnecessarily increase the bandwidth required to stream encoded versions of media titles to endpoint devices. Another technological improvement relative to the prior art is that the encoding optimizer application positions key frames within encoded video sequences based on changes in the spatial-temporal properties of the source video sequence. Consequently, the disclosed techniques reduce encoding inefficiencies attributable to encoding frames that immediately follow relatively similar frames as key frames. Yet another technological improvement relative to prior art is that storing each unique encoded individual shot sequences as an individual file may reduce the total resources required to store the encoded video sequences.

1. In some embodiments, a computer-implemented method comprises partitioning a source video sequence associated with a media title into a plurality of subsequences that includes a first subsequence and a second subsequence; generating a first encoded subsequence based on the first subsequence and a first resolution; generating a second encoded subsequence based on the second subsequence and a second resolution that is higher than the first resolution; and aggregating the first encoded subsequence and the second encoded subsequence to generate a first encoded video sequence, wherein at least a portion of the first encoded video sequence is subsequently streamed to an endpoint device during a playback of the media title.

2. The computer-implemented method of clause 1, wherein each of the subsequences included in the plurality of subsequences comprises a shot sequence.

3. The computer-implemented method of clauses 1 or 2, further comprising computing the first resolution based on a two-dimensional frequency spectrum of a first frame included in the first subsequence.

4. The computer-implemented method of any of clauses 1-3, further comprising, prior to aggregating the first encoded subsequence and the second encoded subsequence generating a third encoded subsequence based on the first subsequence and a third resolution that is lower than the first resolution; computing a delta bitrate based on a first bitrate associated with the first encoded subsequence and a second bitrate associated with the third encoded subsequence; computing a delta visual quality score based on a first visual quality score associated with the first encoded subsequence and a second visual quality score associated with the third encoded subsequence, wherein both the first visual quality score and the second visual quality score are associated with a target resolution; and determining that the first encoded subsequence, but not the third encoded subsequence, complies with a optimization constraint based on the delta bitrate and the delta visual quality score.

5. The computer-implemented method of any of clauses 1-4, further comprising, prior to aggregating the first encoded subsequence and the second encoded subsequence generating a third encoded subsequence based on the first subsequence and the second resolution; computing a delta bitrate based on a first bitrate associated with the first encoded subsequence and a second bitrate associated with the second encoded subsequence; computing a delta visual quality score based on a first visual quality score associated with the first encoded subsequence and a second visual quality score associated with the second encoded subsequence, wherein both the first visual quality score and the second visual quality score are associated with a target resolution; determining that the third encoded subsequence does not comply with an optimization constraint based on the delta bitrate and the delta visual quality score; and discarding the third encoded subsequence.

6. The computer-implemented method of any of clauses 1-5, wherein the first visual quality score comprises a video multimethod assessment fusion score, a harmonic video multimethod assessment fusion score, or a peak-signal-to-noise ratio.

7. The computer-implemented method of any of clauses 1-6, further comprising generating a third encoded subsequence based on the first subsequence and the second resolution; aggregating the third encoded subsequence and the second encoded subsequence to generate a second encoded video sequence that is associated with a higher bitrate than the first encoded video sequence, wherein at least a portion of the second encoded video sequence, instead of the at least a portion of the first encoded video sequence, is subsequently streamed to the endpoint device during the playback of the media title.

8. The computer-implemented method of any of clauses 1-7, wherein the at least the portion of the first encoded video sequence comprises both the first encoded subsequence and the second encoded subsequence, and the first encoded video sequence is streamed to the endpoint device via a first file and the second encoded video sequence is streamed to the endpoint device via a second file.

9. The computer-implemented method of any of clauses 1-8, further comprising computing a first visual quality score based on the first encoded video sequence and a target resolution; specifying the first visual quality score via a manifest file associated with the media title; and transmitting the manifest file to the endpoint device.

10. In some embodiments, a computer-readable storage medium includes instructions that, when executed by a processor, cause the processor to perform the steps of generating a first encoded shot sequence based on a first shot sequence included in a source video sequence and a first resolution, wherein the source video sequence is associated with a media title; generating a second encoded shot sequence based on a second shot sequence included in the source video sequence and a second resolution that is higher than the first resolution; and generating a first encoded video sequence based on the first encoded shot sequence and the second encoded shot sequence, wherein at least a portion of the first encoded video sequence is subsequently streamed to an endpoint device during a playback of the media title.

11. The computer-readable storage medium of clause 10, further comprising computing the first resolution based on a two-dimensional frequency spectrum of a first frame included in the first shot sequence.

12. The computer-readable storage medium of clauses 10 or 11, further comprising computing the two-dimensional frequency spectrum based on a fast Fourier transform algorithm and the first frame.

13. The computer-readable storage medium of any of clauses 10-12, further comprising, prior to generating the first encoded video sequence generating a third encoded shot sequence based on the first shot sequence and a third resolution that is lower than the first resolution; computing a delta bitrate based on a first bitrate associated with the first encoded shot sequence and a second bitrate associated with the third encoded shot sequence; computing a delta visual quality score based on a first visual quality score associated with the first encoded shot sequence and a second visual quality score associated with the third encoded shot sequence, wherein both the first visual quality score and the second visual quality score are associated with a target resolution; and determining that the first encoded shot sequence, but not the third encoded shot sequence, complies with a optimization constraint based on the delta bitrate and the delta visual quality score.

14. The computer-readable storage medium of any of clauses 10-13, further comprising, prior to prior to generating the first encoded video sequence generating a third encoded shot sequence based on the first shot sequence and the second resolution; computing a delta bitrate based on a first bitrate associated with the first encoded shot sequence and a second bitrate associated with the second encoded shot sequence; computing a delta visual quality score based on a first visual quality score associated with the first encoded shot sequence and a second visual quality score associated with the second encoded shot sequence, wherein both the first visual quality score and the second visual quality score are associated with a target resolution; determining that the third encoded shot sequence does not comply with an optimization constraint based on the delta bitrate and the delta visual quality score; and discarding the third encoded shot sequence.

15. The computer-readable storage medium of any of clauses 10-14, further comprising generating a third encoded shot sequence based on the first shot sequence and the second resolution; and generating a second encoded video sequence that is associated with a higher bitrate than the first encoded video sequence based on the third encoded shot sequence and the second encoded shot sequence, wherein at least a portion of the second encoded video sequence, instead of the at least a portion of the first encoded video sequence, is subsequently streamed to the endpoint device during the playback of the media title.

16. The computer-readable storage medium of any of clauses 10-15, wherein the at least the portion of the first encoded video sequence is streamed to the endpoint device via a first file that includes the first encoded video sequence, and the at least the portion of the second encoded video sequence is streamed to the endpoint device via a second file that includes the second encoded video sequence.

17. The computer-readable storage medium of any of clauses 10-16, further comprising computing a first visual quality score based on the first encoded video sequence and a target resolution; specifying the first visual quality score via a manifest file associated with the media title; and transmitting the manifest file to the endpoint device.

18. The computer-readable storage medium of any of clauses 10-17, wherein the first visual quality score comprises a video multimethod assessment fusion score, a harmonic video multimethod assessment fusion score, or a peak-signal-to-noise ratio.

19. In some embodiments a system comprises a memory storing instructions; and a processor that is coupled to the memory and, when executing the instructions, is configured to generate a first encoded shot sequence based on a first shot sequence included in a source video sequence and a first resolution; generate a second encoded shot sequence based on a second shot sequence included in the source video sequence and a second resolution that is higher than the first resolution; and aggregate the first encoded shot sequence and the second encoded shot sequence to generate a first encoded video sequence, wherein at least a portion of the first encoded video sequence is subsequently streamed to an endpoint device during a playback of a media title that is associated with the source video sequence.

20. The system of clause 19, wherein the processor is further configured to generate a third encoded shot sequence based on the first shot sequence and the second resolution; and aggregate the third encoded shot sequence and the second encoded shot sequence to generate a second encoded video sequence that is associated with a higher bitrate than the first encoded video sequence, wherein at least a portion of the second encoded video sequence, instead of the at least a portion of the first encoded video sequence, is subsequently streamed to the endpoint device during the playback of the media title.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for streaming a media title, the method comprising:
   selecting a first encoded file from a plurality of encoded files based on first metadata associated with the plurality of encoded files, wherein each of a plurality of encoded shot sequences that are associated with a plurality of shot sequences and are included in the first encoded file complies with a first threshold for a tradeoff metric, wherein the first encoded file is generated by:
      computing a first value of the tradeoff metric based on a first change in bitrate and a first change in visual quality when increasing from a first resolution at which a first shot sequence included in the plurality of shot sequences is encoded to a second resolution at which the first shot sequence is encoded,
      computing a second value of the tradeoff metric based on a second change in bitrate and a second change in visual quality when increasing from the first resolution at which a second shot sequence included in the plurality of shot sequences is encoded to the second resolution at which the second shot sequence is encoded,
      selecting, based on the first value, the second value, and the first threshold, either the first resolution or the second resolution for encoding the first shot sequence and the second shot sequence, and
      including an encoded first shot sequence and an encoded second shot sequence in the first encoded file; and
   requesting at least a portion of the first encoded file from a first server machine for playback.

2. The computer-implemented method of claim 1, wherein the first value of the tradeoff metric is computed using a tradeoff equation based on a ratio of the first change in bitrate to the first change in visual quality when increasing the resolution at which the first shot sequence is encoded from the first resolution to the second resolution.

3. The computer-implemented method of claim 1, wherein selecting the first encoded file comprises performing one or more adaptive streaming operations on a second plurality of encoded shot sequences included in the plurality of encoded files based on the first metadata and at least one of an available bandwidth, a type of the media title, and a viewer preference to determine one of the plurality of encoded shot sequences included in the first encoded file for playback.

4. The computer-implemented method of claim 1, wherein the first metadata comprises at least one of a plurality of quality scores or a plurality of bitrates.

5. The computer-implemented method of claim 1, wherein the first metadata includes a first quality score that comprises a video multimethod assessment fusion score, a harmonic video multimethod assessment fusion score, or a peak-signal-to-noise ratio.

6. The computer-implemented method of claim 1, wherein the first encoded file includes one encoded video sequence that includes a different encoded shot sequence for each shot sequence included in the plurality of shot sequences associated with the media title.

7. The computer-implemented method of claim 1, further comprising:
   selecting a second encoded file from the plurality of encoded files based on the first metadata, wherein each of one or more encoded shot sequences included in the second encoded file complies with a second threshold for the tradeoff metric; and
   requesting at least a portion of the second encoded file from the first server machine for playback after the at least the portion of the first encoded file.

8. The computer-implemented method of claim 1, further comprising receiving a stream from the first server machine that includes the at least the portion of the first encoded file and second metadata associated with the first encoded file.

9. The computer-implemented method of claim 1, further comprising, prior to selecting the first encoded file, receiving a manifest file from the first server machine or a second server machine, wherein the manifest file specifies the first metadata.

10. One or more non-transitory computer-readable media including instructions that, when executed by one or more processors, cause the one or more processors to stream a media title, by performing the steps of:
   selecting a first encoded file from a plurality of encoded files based on first metadata associated with the plurality of encoded files, wherein each of a plurality of encoded shot sequences that are associated with a plurality of shot sequences and are included in the first encoded file complies with a first threshold for a tradeoff metric, wherein the first encoded file is generated by:
      computing a first value of the tradeoff metric based on a first change in bitrate and a first change in visual quality when increasing from a first resolution at which a first shot sequence included in the plurality of shot sequences is encoded to a second resolution at which the first shot sequence is encoded,
      computing a second value of the tradeoff metric based on a second change in bitrate and a second change in visual quality when increasing from the first resolution at which a second shot sequence included in the plurality of shot sequences is encoded to the second resolution at which the second shot sequence is encoded, selecting, based on the first value, the second value, and the first threshold, either the first resolution or the second resolution for encoding the first shot sequence and the second shot sequence, and including an encoded first shot sequence and an encoded second shot sequence in the first encoded file; and requesting at least a portion of the first encoded file from a first server machine for playback.

11. The one or more non-transitory computer-readable media of claim 10, wherein the first value of the tradeoff metric is computed using a tradeoff equation based on a ratio of the first change in bitrate to the first change in visual quality when increasing the resolution at which the first shot sequence is encoded from the first resolution to the second resolution.

12. The one or more non-transitory computer-readable media of claim 10, wherein selecting the first encoded file comprises performing one or more adaptive streaming operations on a second plurality of encoded shot sequences included in the plurality of encoded files based on the first metadata and at least one of an available bandwidth, a media title type, and a viewer preference to determine one of the plurality of encoded shot sequences included in the first encoded file for playback.

13. The one or more non-transitory computer-readable media of claim 10, wherein the first metadata comprises at least one of a plurality of quality scores or a plurality of bitrates.

14. The one or more non-transitory computer-readable media of claim 10, wherein the first metadata includes a first quality score that comprises a video multimethod assessment fusion score, a harmonic video multimethod assessment fusion score, or a peak-signal-to-noise ratio.

15. The one or more non-transitory computer-readable media of claim 10, wherein the first encoded file includes one encoded video sequence that includes a different encoded shot sequence for each shot sequence included in the plurality of shot sequences associated with the media title.

16. The one or more non-transitory computer-readable media of claim 10, further comprising:

selecting a second encoded file from the plurality of encoded files based on the first metadata, wherein each of one or more encoded shot sequences included in the second encoded file complies with a second threshold for the tradeoff metric; and requesting at least a portion of the second encoded file from the first server machine for playback after the at least the portion of the first encoded file.

17. The one or more non-transitory computer-readable media of claim 10, further comprising receiving a stream from the first server machine that includes the at least the portion of the first encoded file and second metadata associated with the first encoded file.

18. The one or more non-transitory computer-readable media of claim 10, further comprising, prior to selecting the first encoded file, receiving a manifest file from the first server machine or a second server machine, wherein the manifest file specifies the first metadata.

19. A system, comprising:

one or more memories storing instructions; and one or more processors that are coupled to the one or more memories and, when executing the instructions, are configured to perform the steps of:

selecting a first encoded file from a plurality of encoded files based on first metadata associated with the plurality of encoded files, wherein each of a plurality of encoded shot sequences that are associated with a plurality of shot sequences and are included in the first encoded file complies with a first threshold for a tradeoff metric, wherein the first encoded file is generated by:

computing a first value of the tradeoff metric based on a first change in bitrate and a first change in visual quality when increasing from a first resolution at which a first shot sequence included in the plurality of shot sequences is encoded to a second resolution at which the first shot sequence is encoded, computing a second value of the tradeoff metric based on a second change in bitrate and a second change in visual quality when increasing from the first resolution at which a second shot sequence included in the plurality of shot sequences is encoded to the second resolution at which the second shot sequence is encoded, selecting, based on the first value, the second value, and the first threshold, either the first resolution or the second resolution for encoding the first shot sequence and the second shot sequence, and including an encoded first shot sequence and an encoded second shot sequence in the first encoded file; and requesting at least a portion of the first encoded file from a first server machine for playback.

* * * * *